US006969006B1

United States Patent
Smith, Sr.

(10) Patent No.: US 6,969,006 B1
(45) Date of Patent: Nov. 29, 2005

(54) ROTABLE PORTABLE CARD HAVING A DATA STORAGE DEVICE, APPARATUS AND METHOD FOR USING SAME

(75) Inventor: Malcolm G. Smith, Sr., Baja California Sur (MX)

(73) Assignee: UltraCard, Inc., Bend, OR (US)

( * ) Notice: Subject to any disclaimer, the term of this patent is extended or adjusted under 35 U.S.C. 154(b) by 312 days.

(21) Appl. No.: 09/663,832

(22) Filed: Sep. 15, 2000

(51) Int. Cl.⁷ ............................................. G06K 19/00
(52) U.S. Cl. ................................... 235/487; 360/97.04
(58) Field of Search ................................. 235/449, 493, 235/487; 369/13.07; 360/97.04; 428/694 MM, 694 SL

(56) References Cited

U.S. PATENT DOCUMENTS

| | | | |
|---|---|---|---|
| 1,756,547 A | | 4/1930 | Hansen |
| 3,677,843 A | | 7/1972 | Reiss |
| 3,838,252 A | | 9/1974 | Hynes et al. |
| 3,864,755 A | * | 2/1975 | Hargis .......................... 360/133 |

(Continued)

FOREIGN PATENT DOCUMENTS

| EP | 0194675 | 9/1986 |
|---|---|---|
| JP | 10041118 | 4/1998 |
| JP | 10144391 A | 5/1998 |
| WO | WO 9210485 | 12/1992 |

OTHER PUBLICATIONS (One Page) Advertising Brochure, Iomega Click! PC Card Drive (40 MB Disk) Iomega Corporation, 1999.
Gooch et al. "A High Resolution Flying Magnetic Disk Recording System With Zero Reproduce Spacing Loss" pp. 4545–4554, IEEE Transactions on Magnetics, vol. 27, No. 6, Nov. 1991.
One (1) Page Advertising Brochure, SysTECH, Wallet Size CDROM, Copyright 1999.
Three (3) Pages / Gold CD Mini ROM (Picture), Back/Front Packaging for CD Mini ROM AOL, America On Line.

(Continued)

*Primary Examiner*—Michael G. Lee
*Assistant Examiner*—Daniel A. Hess
(74) *Attorney, Agent, or Firm*—Beyer, Hoffman & Harms LLP; Patrick T. Bever

(57) ABSTRACT

A portable card adapted to be used in a card processing system having a data processing station is shown. The portable card includes a data storage device which is adapted to interact with a data processing station when a portable card and a data processing station are rotationally moved relative to each other. The data storage device includes a substrate having a predetermined shape and at least one layer of magnetic material for storing magnetic signals. Apparatus and a method for using the rotational portable card having a data storage section is also shown.

5 Claims, 24 Drawing Sheets

U.S. PATENT DOCUMENTS

| | | | |
|---|---|---|---|
| 4,006,507 A | 2/1977 | Yoshida | |
| 4,058,839 A | 11/1977 | Darjany | |
| 4,076,125 A | 2/1978 | Ohsaki et al. | |
| 4,100,689 A | 7/1978 | Broune | |
| 4,104,682 A | 8/1978 | Lehner et al. | |
| 4,141,400 A | 2/1979 | Mangan | |
| 4,197,988 A | 4/1980 | Moss et al. | |
| 4,209,811 A | 6/1980 | Blazevic | |
| 4,277,809 A | 7/1981 | Fisher et al. | |
| 4,302,523 A | 11/1981 | Audran et al. | |
| 4,318,136 A | 3/1982 | Jeffers | |
| D264,853 S | 6/1982 | Scavino et al. | |
| 4,403,138 A | 9/1983 | Battarel et al. | |
| 4,450,955 A | 5/1984 | Featherston | |
| 4,503,125 A | 3/1985 | Nelson et al. | |
| 4,518,627 A * | 5/1985 | Foley et al. | 427/48 |
| 4,530,016 A | 7/1985 | Sawazaki | |
| 4,535,369 A | 8/1985 | Sawazaki | |
| 4,581,523 A | 4/1986 | Okuno | |
| 4,585,929 A | 4/1986 | Brown et al. | |
| 4,592,042 A | 5/1986 | Lemelson et al. | |
| 4,598,196 A | 7/1986 | Pierce et al. | |
| 4,609,812 A | 9/1986 | Drexler | |
| 4,612,436 A | 9/1986 | Okada | |
| 4,620,727 A | 11/1986 | Stockburger et al. | |
| 4,659,915 A | 4/1987 | Flies | |
| 4,672,182 A | 6/1987 | Hirokawa | |
| 4,683,371 A | 7/1987 | Drexler | |
| 4,687,712 A | 8/1987 | Sugita et al. | |
| 4,701,601 A | 10/1987 | Francini et al. | |
| 4,707,593 A | 11/1987 | Murata et al. | |
| D293,694 S | 1/1988 | Alden et al. | |
| 4,718,697 A | 1/1988 | Berardus van Amelsfort | |
| 4,731,645 A | 3/1988 | Parmentier et al. | |
| 4,754,128 A | 6/1988 | Takeda et al. | |
| 4,756,967 A | 7/1988 | Hashimoto et al. | |
| 4,774,618 A | 9/1988 | Raviv | |
| 4,777,540 A | 10/1988 | McCoy | |
| 4,780,604 A | 10/1988 | Hasegawa et al. | |
| 4,786,564 A | 11/1988 | Chen et al. | |
| 4,791,283 A | 12/1988 | Burkhardt | |
| 4,812,633 A | 3/1989 | Vogelgesang et al. | |
| 4,826,772 A | 5/1989 | Meathrel | |
| 4,833,310 A | 5/1989 | Shimamura et al. | |
| 4,851,610 A | 7/1989 | LeBlanc et al. | |
| 4,868,373 A * | 9/1989 | Opheij et al. | 235/380 |
| 4,877,488 A | 10/1989 | Cody et al. | |
| 4,889,755 A | 12/1989 | Charbonneau | |
| 4,897,533 A | 1/1990 | Lyszczarz | |
| D305,887 S | 2/1990 | Nishimura | |
| 4,931,623 A | 6/1990 | Nakamura et al. | |
| 4,937,438 A | 6/1990 | Warwick et al. | |
| 4,978,401 A | 12/1990 | Bonomi | |
| 4,985,795 A | 1/1991 | Gooch | |
| 4,998,009 A | 3/1991 | Iijima et al. | |
| 5,036,430 A | 7/1991 | Hills | |
| 5,041,922 A * | 8/1991 | Wood et al. | 360/55 |
| 5,049,728 A | 9/1991 | Rovin | |
| 5,051,288 A | 9/1991 | Ahlert et al. | |
| 5,055,155 A | 10/1991 | Crotty et al. | |
| 5,099,111 A | 3/1992 | Takakura et al. | |
| 5,101,097 A | 3/1992 | Conant | |
| 5,107,099 A | 4/1992 | Smith | |
| D328,457 S | 8/1992 | Matsuzaka | |
| 5,147,732 A | 9/1992 | Shiroishi et al. | |
| 5,172,282 A * | 12/1992 | Ghose | 360/78.12 |
| 5,180,640 A | 1/1993 | Yamashita et al. | |
| 5,191,198 A | 3/1993 | Do | |
| 5,204,513 A | 4/1993 | Steele | |
| 5,206,489 A | 4/1993 | Warwick | |
| 5,206,494 A | 4/1993 | Metzger | |
| 5,217,056 A | 6/1993 | Ritter | |
| 5,221,838 A | 6/1993 | Gutman et al. | |
| 5,227,212 A * | 7/1993 | Ahlert et al. | 360/97.01 |
| 5,236,791 A | 8/1993 | Yahisa et al. | |
| 5,254,843 A | 10/1993 | Hynes et al. | |
| 5,270,523 A | 12/1993 | Chang et al. | |
| 5,286,958 A | 2/1994 | Smeets | |
| 5,288,942 A | 2/1994 | Godfrey | |
| 5,309,388 A | 5/1994 | Maruyama et al. | |
| 5,311,003 A | 5/1994 | Saroya | |
| 5,321,243 A | 6/1994 | Groves et al. | |
| 5,336,871 A | 8/1994 | Colgate, Jr. | |
| 5,356,717 A | 10/1994 | Choki et al. | |
| 5,362,952 A | 11/1994 | Nair et al. | |
| 5,396,369 A | 3/1995 | Deland, Jr. et al. | |
| 5,396,545 A | 3/1995 | Nair et al. | |
| 5,397,886 A | 3/1995 | Mos et al. | |
| 5,408,384 A | 4/1995 | Gannyo et al. | |
| 5,410,136 A | 4/1995 | McIntire et al. | |
| 5,421,618 A | 6/1995 | Okazaki et al. | |
| 5,426,286 A | 6/1995 | Nair et al. | |
| 5,431,746 A | 7/1995 | Manning et al. | |
| 5,452,143 A | 9/1995 | Kamagami | |
| 5,466,918 A | 11/1995 | Ray et al. | |
| 5,480,685 A | 1/1996 | Suzuki et al. | |
| 5,492,745 A | 2/1996 | Yokoyama | |
| 5,509,083 A | 4/1996 | Abtahi et al. | |
| 5,521,774 A | 5/1996 | Parks et al. | |
| 5,530,232 A | 6/1996 | Taylor | |
| 5,535,078 A | 7/1996 | Warwick | |
| 5,557,089 A | 9/1996 | Hall et al. | |
| 5,559,885 A | 9/1996 | Drexler et al. | |
| 5,588,763 A | 12/1996 | Nubson et al. | |
| 5,598,474 A | 1/1997 | Johnson | |
| 5,609,253 A | 3/1997 | Goade, Sr. | |
| 5,612,526 A | 3/1997 | Oguchi et al. | |
| 5,621,583 A | 4/1997 | Parks et al. | |
| 5,626,970 A | 5/1997 | Hedgcoth | |
| 5,637,174 A | 6/1997 | Field et al. | |
| 5,638,345 A | 6/1997 | Hosoya | |
| 5,679,942 A | 10/1997 | Toyama | |
| 5,679,945 A | 10/1997 | Renner et al. | |
| 5,689,105 A | 11/1997 | Mizoguchi et al. | |
| 5,696,369 A | 12/1997 | Watanabe | |
| 5,698,839 A | 12/1997 | Jagielinski | |
| 5,713,406 A | 2/1998 | Drury | |
| 5,714,747 A | 2/1998 | West et al. | |
| 5,720,500 A | 2/1998 | Okazaki et al. | |
| 5,723,033 A | 3/1998 | Weiss | |
| 5,734,154 A | 3/1998 | Jachimowicz et al. | |
| 5,738,945 A | 4/1998 | Lal et al. | |
| 5,739,975 A | 4/1998 | Parks et al. | |
| 5,748,737 A | 5/1998 | Daggar | |
| 5,756,220 A | 5/1998 | Hoshino et al. | |
| 5,763,862 A | 6/1998 | Jachimowicz et al. | |
| 5,770,942 A | 6/1998 | Tagchi | |
| 5,777,306 A | 7/1998 | Masuda | |
| 5,789,733 A | 8/1998 | Jachimowicz et al. | |
| 5,801,368 A | 9/1998 | Hayashi et al. | |
| 5,808,981 A | 9/1998 | Suzuki | |
| 5,825,393 A | 10/1998 | Kocznar et al. | |
| 5,828,053 A | 10/1998 | Kinugasa | |
| 5,834,756 A | 11/1998 | Gutman et al. | |
| 5,843,565 A | 12/1998 | Davies et al. | |
| 5,844,218 A | 12/1998 | Kawan et al. | |
| 5,844,230 A | 12/1998 | Lalonde | |
| 5,851,688 A | 12/1998 | Chen et al. | |
| 5,852,289 A | 12/1998 | Masahiko | |
| 5,857,079 A | 1/1999 | Claus et al. | |
| 5,859,419 A | 1/1999 | Wynn | |

| | | | | | | |
|---|---|---|---|---|---|---|
| 5,861,220 A | 1/1999 | Coughlin | | D429,733 S | 8/2000 | Jones et al. |
| 5,862,174 A | 1/1999 | Yokota et al. | | 6,116,655 A | 9/2000 | Thouin et al. |
| 5,866,891 A | 2/1999 | Fujimoto et al. | | 6,131,816 A | 10/2000 | Smith, Sr. |
| 5,869,823 A | 2/1999 | Bublitz et al. | | D436,991 S | 1/2001 | Morgante |
| 5,880,445 A | 3/1999 | Mori et al. | | 6,186,398 B1 | 2/2001 | Kato et al. |
| 5,880,454 A | 3/1999 | Monicault | | 6,196,047 B1 * | 3/2001 | Carnegie et al. ............ 73/1.11 |
| 5,883,377 A | 3/1999 | Chapin, Jr. | | 6,221,508 B1 | 4/2001 | Kanbe et al. |
| 5,884,271 A | 3/1999 | Pitroda | | 6,238,809 B1 | 5/2001 | Wu et al. |
| 5,886,333 A | 3/1999 | Miyake | | 6,254,713 B1 | 7/2001 | Riehle |
| 5,889,273 A | 3/1999 | Goto | | 6,268,919 B1 * | 7/2001 | Meeks et al. ............... 356/381 |
| D408,377 S | 4/1999 | Ferchau et al. | | D447,146 S | 8/2001 | Myers |
| 5,895,903 A | 4/1999 | Abe et al. | | D448,776 S | 10/2001 | Weng et al. |
| 5,895,909 A | 4/1999 | Yoshida | | 6,301,068 B1 * | 10/2001 | Ionescu ...................... 360/68 |
| 5,898,612 A | 4/1999 | Chen et al. | | 6,311,893 B1 * | 11/2001 | Liu et al. .................... 235/454 |
| 5,901,012 A | 5/1999 | Ishida | | 6,378,037 B1 * | 4/2002 | Hall .......................... 711/113 |
| 5,901,303 A | 5/1999 | Chew | | 6,398,114 B1 | 6/2002 | Nishikawa et al. |
| D410,769 S | 6/1999 | Dorizas | | 6,430,114 B1 | 8/2002 | Wang et al. |
| 5,928,759 A | 7/1999 | Arita et al. | | RE38,290 E * | 10/2003 | Rose ......................... 360/131 |
| 5,939,202 A | 8/1999 | Ataka et al. | | 6,677,105 B2 | 1/2004 | Wang et al. |
| 5,941,375 A | 8/1999 | Kamens et al. | | 2003/0024995 A1 | 2/2003 | Conner et al. |
| 5,942,744 A * | 8/1999 | Kamo et al. ................ 235/487 | | 2003/0043485 A1 | 3/2003 | Conner et al. |
| 5,979,774 A | 11/1999 | Urushibata | | 2003/0218064 A1 | 11/2003 | Conner et al. |
| 5,997,042 A | 12/1999 | Blank | | | | |
| D425,876 S | 5/2000 | Maiers et al. | | | | |
| 6,079,621 A | 6/2000 | Vardanyan et al. | | * cited by examiner | | |
| 6,080,476 A | 6/2000 | Kanbe et al. | | | | |

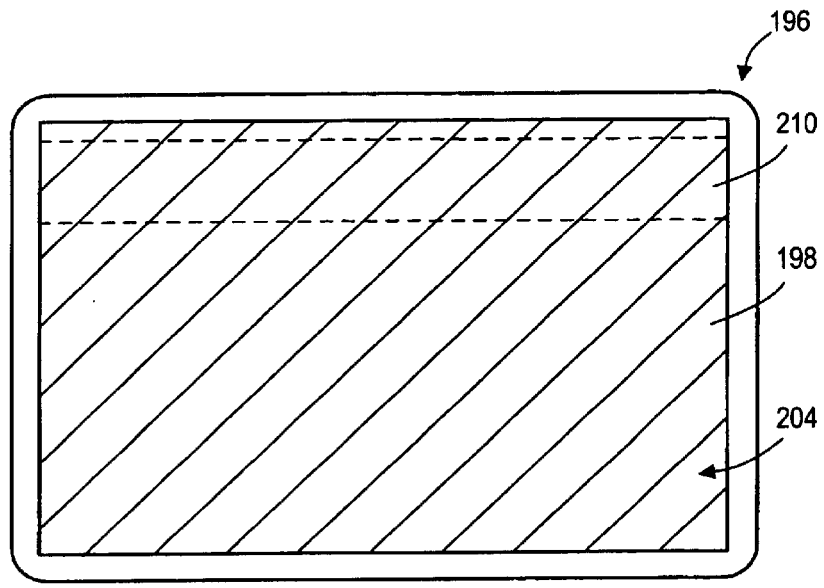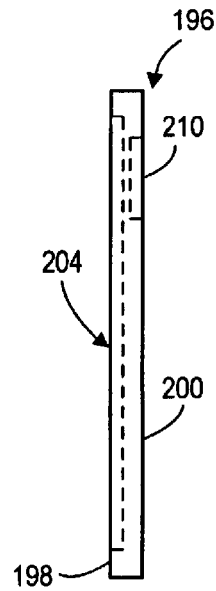
Fig. 19  Fig. 20
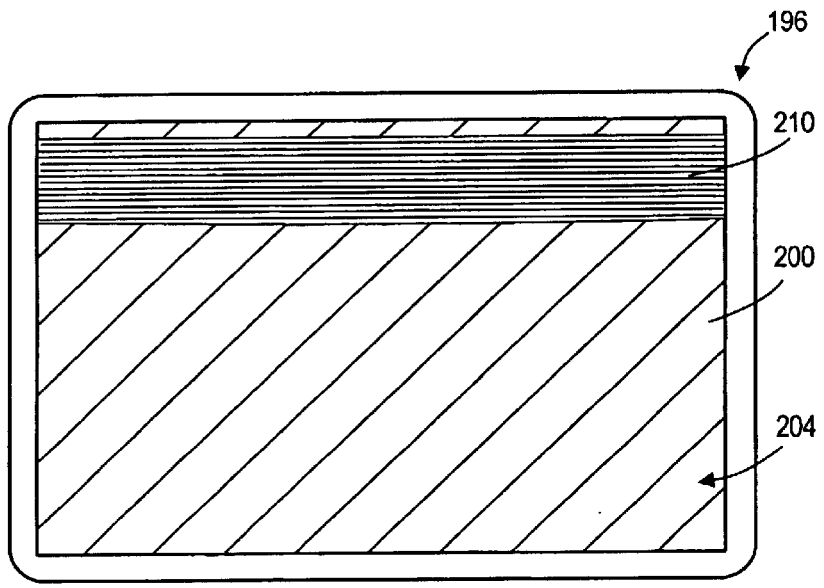
Fig. 21

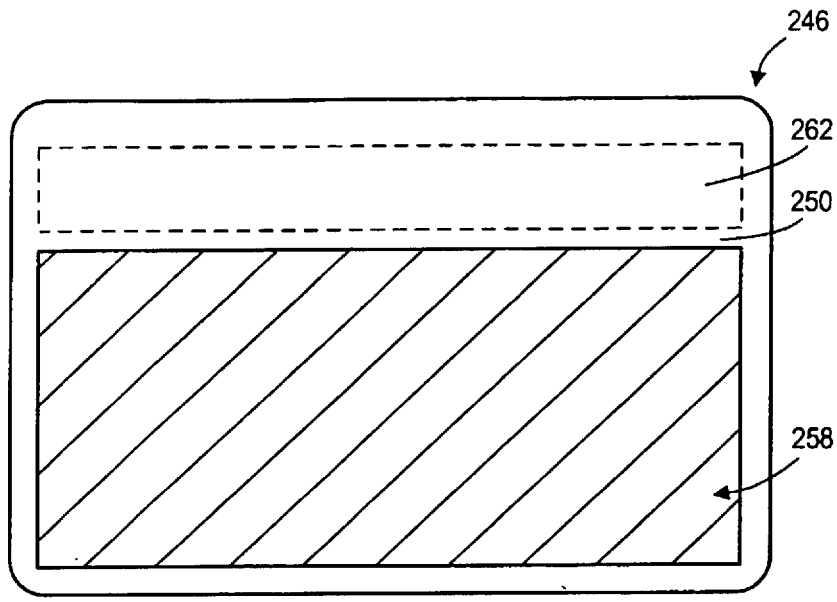 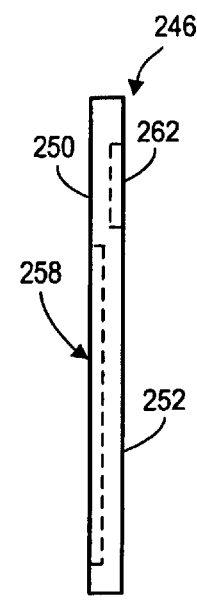
Fig. 26    Fig. 27
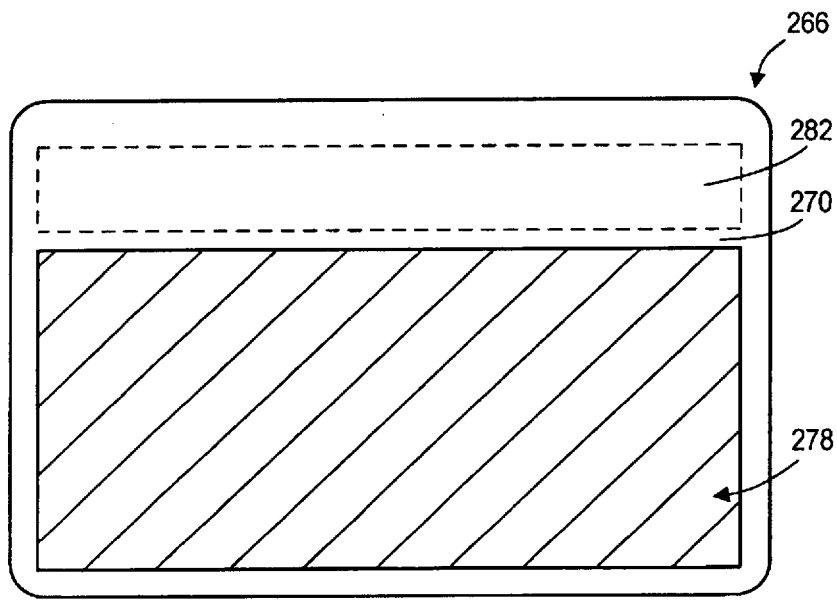 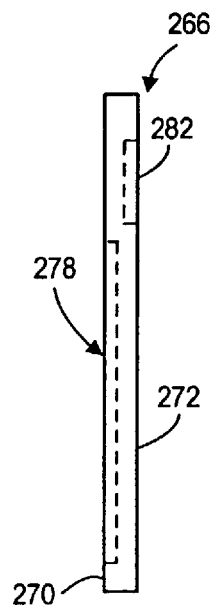
Fig. 28    Fig. 29

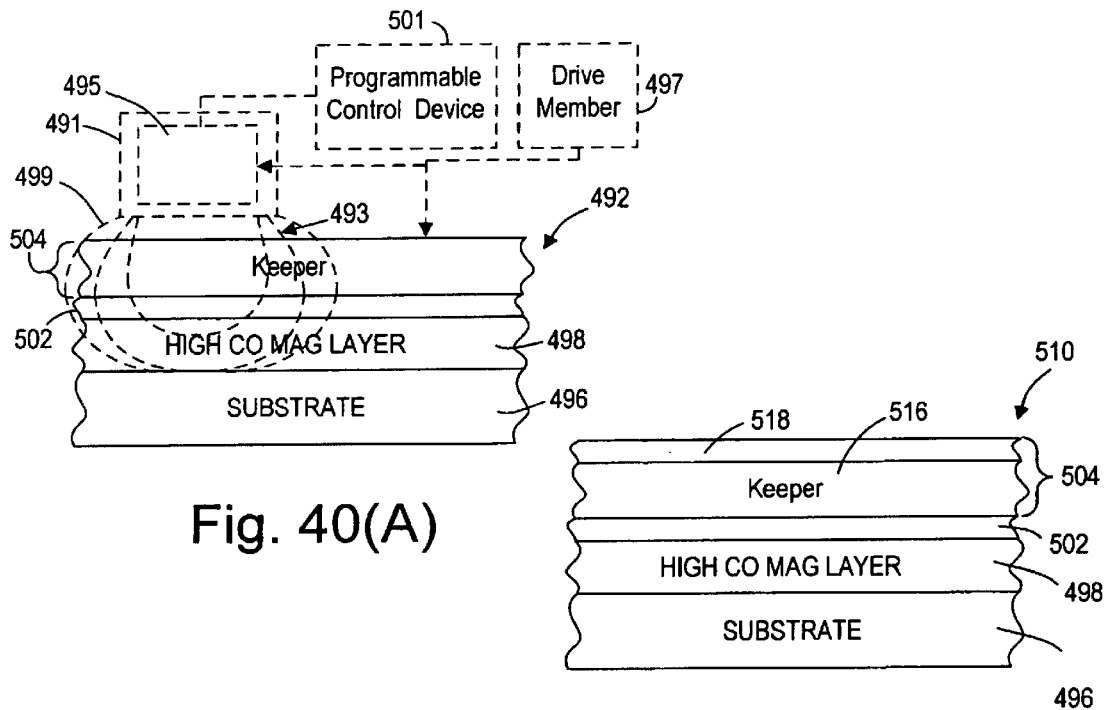
Fig. 40(A)
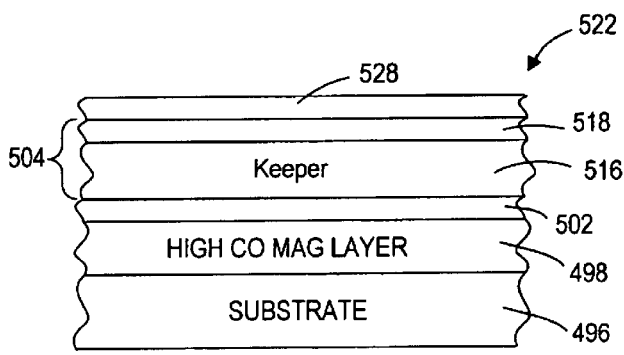
Fig. 40(B)
Fig. 40(C)
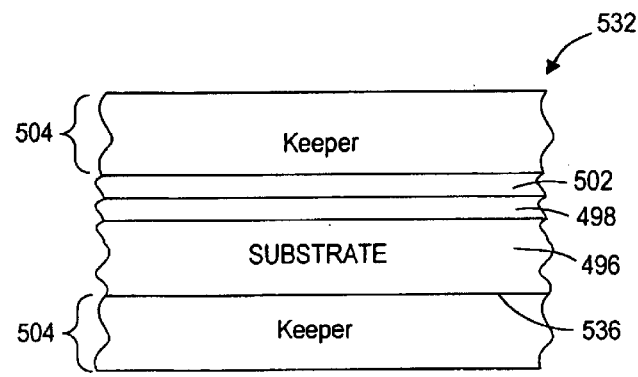
Fig. 40(D)

Arcurate Down Card

Rotating Scanner

ROTABLE PORTABLE CARD HAVING A DATA STORAGE DEVICE, APPARATUS AND METHOD FOR USING SAME

BACKGROUND OF THE INVENTION

1. Field of the Invention

This invention relates generally to data storage devices and more particularly to a portable storage device or a portable card incorporating a data storage device which is capable of having information recorded into and read from the data storage device. The portable storage device or portable card may be in the form of an encodeable card having a magnetic or optical data storage device adapted to be used as a credit card, medical identification card, identification card or the like.

The data storage device utilizes a recording medium or a data storage medium formed on a substrate capable of reliable data recording and reproduction in an ambient natural atmospheric operating environment. Traditional hard disks require a profoundly protected environment for reliable data recording and reproduction. In the preferred embodiment, the data storage device is in the form of a magnetically encodeable credit card having a data storage capability in the order of about 1 megabyte to about 500 megabytes or more.

2. Description of the Prior Art

The prior art magnetically encodeable card, illustrated as 100 in FIG. 1 through 4, have primary application as financial credit cards. The magnetically encodeable card has an obverse surface or side 102 containing indicia, e.g. typically user and/or bank information and a converse surface or side 104 containing an encoding section shown generally as 106. To insure that magnetically encoded cards can be read by standard card reading devices, the prior art cards are fabricated in accordance with standards promulgated by the American National Standards Institute, Inc. ("American National Standard" or "ANSI"). This is discussed in greater detail hereinbelow.

The encoding section 106 is typically a wide magnetic stripe area 110 shown on FIG. 2 and this format is generally used by the AMERICAN EXPRESS® or AMEX® credit card.

Alternatively, a narrow magnetic stripe, as shown by dashed line 112 shown in FIG. 2 defining a narrow magnetic stripe area 114, is used by Visa® and most other credit cards. Typically, the substrate for both the VISA® credit card and the AMEX® credit card is formed of polyvinyl chloride ("PVC") and/or polyvinyl chloride acetate ("PVCA"). VISA®, AMERICAN EXPRESS® and other financial institutions make wide use of magnetically encoded cards for financial transactions.

Another known card used for credit or banking transaction is a Smart Card 120 illustrated in FIGS. 5 through 7. The typical Smart Card 120 has an integrated circuit shown as 122 located on the obverse side 126 thereof. The integrated circuit 122 may include a dedicated storage member. The converse side 128 of the Smart Card 120 may be blank or alternatively may include a magnetic stripe area similar to magnetic stripe areas 110 and 114 as illustrated in FIG. 2.

BACKGROUND

The term "data card" is used in the art to define both financial cards and cards that contain non-financial data. The terms "financial cards" or "financial credit cards" generally include credit cards, debit cards, A.T.M. cards and other cards that contain financial data. Examples of financial cards include general purpose financial credit cards e.g. VISA®, AMERICAN EXPRESS®, MASTERCARD®, and specific or special purpose credit cards such as oil company cards, department store cards, car rental cards, hotel cards, airline cards and the like.

U.S. Pat. Nos. 5,396,545 and 4,791,283 disclose typical state-of-the-art financial cards or transaction cards having a single magnetic stripe. The storage densities of single stripe magnetic cards are defined by the ANSI Standard Specifications. Prior art magnetically encoded cards may have up to three (3) data tracks as described in Table 1 below:

TABLE 1

| Track | Density | Targeted Application |
| --- | --- | --- |
| 1 | 553 bytes | Designed for Airline Use |
| 2 | 200 bytes | Designed for Credit Card Use |
| 3 | 535 bytes | Not for General use. reserved for Special Applications, Has Read/Write Capability |
| Total Storage | 1,306 bytes | |

A general trend presently exists to develop special purpose data cards for non-financial data applications such as for driver's licenses, building security, insurance identification, medical insurance identification, personal identification, inventory identification, baggage tags and the like.

Since the use of data cards including financial cards and other cards used for non-financial data purposes has proliferated significantly over the past several years, such data cards are being fabricated to be machine readable by a wide variety of reading devices and apparatus. As discussed above, typically a financial card has a single magnetic stripe having three (3) data tracks. Certain of the reading devices are used for "read-only" applications while other of the reading devices are used for "read and/or write" applications using one or more of the three (3) data tracks.

Other known prior art magnetically encodeable cards have at least two magnetic stripes, each of which may have one or more data tracks, for recording and writing data.

United States Patents disclosing cards having one or more magnetic strips and/or semiconductor memory include U.S. Pat. Nos. 5,883,377; 5,844,230; 5,59,885 and 5,714,747. Certain of these cards using a semi-conductor memory have storage densities as high as 8 kilobytes.

In order to facilitate reliable reading by such reading devices, financial cards are fabricated in accordance with standards promulgated by ANSI. For example, the American National Standard for Identification Cards—Physical Characteristics is covered by the ANSI/ISO/IEC 7810-1995 Standard (the "ANSI/ISO/IEC 7810-1995 Standard"). The ANSI/ISO/IEC 7810-1995 Standard specifies the physical characteristics of identifications including card materials, construction, characteristics and dimensions for various sizes of financial cards.

In addition, financial credit cards must comply with the American National Standard for Identification Cards—Recording Technique—Part 4: Location of Read-Only Magnetic Tracks—Tracks 1 and 2 which is covered by the ANSI/ISO/IEC 7811-4-1995 Standard (the "ANSI/ISO/IEC 7811-4-1995 Standard"). The ANSI/ISO/IEC 7811-4-1995 Standard specifies the location of a magnetic stripe area which defines a magnetic track for read-only magnetic recording, tracks 1 and 2 on identification cards. The ANSI/ISO/IEC 7811-4-1995 Standard specifically identifies the location of encoded data tracks, and the beginning and end of encoding.

Further, and depending on the application or use, financial credit cards must comply with the American National Standard for Identification Cards—Recording Technique—Part 5: Location of Read-Write Magnetic Tracks—Track 3 which is covered by the ANSI/ISO/IEC 7811-5-1995 Standard (the "ANSI/ISO/IEC 7811-5-1995 Standard"). The ANSI/ISO/IEC 7811-5-1995 Standard specifies the location of a magnetic stripe area which defines a magnetic track for read-write magnetic recording, track 3 on identification cards. The ANSI/ISO/IEC 7811-5-1995 Standard likewise specifically identifies the location of encoded data tracks, and the beginning and end of encoding.

Financial credit cards include a magnetic stripe area which complies with all of the ANSI Standards. Adherence to the ANSI Standards ensures that financial credit cards can accurately pass magnetic signals between the card reader transducer and the magnetic stripe area.

In the prior art known credit cards having a magnetic stripe area, the obverse side of the card generally contains indicia used to identify the individual to whom the credit card is issued, the issuing bank and other appropriate information. Information is stored on the magnetic stripe area in a "Biphase" mark coding technique in "magnetic domains" defined by a leading and an associated trailing magnetic flux reversal. The spacing between the magnetic domains defines the areal density of the magnetic storage material. Thus, the information bits (data) on a magnetic stripe area is represented by a sequence of binary ones and zeros as defined above.

The standard densities for financial or credit cards having magnetic stripe areas having three (3) data tracks which are in compliance with the ANSI Standards as described above are in the order of: (i) 210 bytes per inch (BPI) for track 1; (ii) in the order of 75 BPI for track 2 and (iii) in the order of 210 BPI for track 3. The transducers used in card reader are responsive to one or more tracks; e.g., any one or more of track 1, track 2 or track 3.

As the demand for financial or credit cards or data cards for non-financial uses increase, in certain applications it is desirable that the data card include the ability to record information from on-line card reading and data processing systems with enhanced security as well. As a result thereof, a category of data cards generally known as "Smart Cards", otherwise generally known as "IC Cards", have developed.

The Smart Card is often defined as an International Standards Organization ("ISO") standard card with an embedded integrated circuit chip. The IC Card may include a microprocessor and a dedicated storage chip thereby resulting in such an IC Card being identified or referred to as a Smart Card. A Smart Card generally is in the form of a standard financial or credit card, but includes a microprocessing chip, memory and may even include a magnetic stripe area which can be read by a standard card reader for financial or credit cards.

One advantage of a Smart Card is that the data stored therein is usually more secure than data stored on a magnetic stripe, and such data cannot be easily read from the Smart Card due to incorporation of encryption technology. Further, the Smart Card has the ability to store a larger quantity of data compared to a magnetic stripe and can be used in a variety of applications in cooperation with a card reading apparatus and data processing system.

U.S. Pat. No. 5,901,303 discloses an example of a Smart Card.

Other known storage devices used in non-card applications, such as for example, data storage mediums in hard disk, have storage densities greater than the storage densities of the known credit cards having one or more magnetic stripes including three (3) data tracks. A data storage medium in a hard disc drive typically has an 130 mm, 95 mm, 65 mm or 25 mm outer diameter with a hole in the middle for mounting the medium on a spindle motor. Hard disk drive medium is designed and manufactured for use as a rotating memory device with circumferential discrete data tracks. The medium, or disks, typically spin at a high rate of speed with the data tracks accessed by one or more a radially movable read/write heads.

It is known in the art to use horizontal recording media for recording magnetic signals. For horizontal recording, the easy axis of magnetization is parallel to the surface of the magnetic layer.

It is also known in the art to use vertical recording media for recording magnetic signals. An example of a vertical magnetic recording medium is disclosed in U.S. Pat. No. 4,687,712.

Through a plating and/or a sputter process, various types and layers of magnetic or non-magnetic materials are deposited on a round substrate which, when used in conjunction with a data recording head, can read and write data to the disk. The layer which provides the data memory is formed of a high coercive force magnetic material. This high coercive force magnetic layer is designed for maximum signal-to-noise ratio. This is attained by circumferential texturing, which is a mechanical process of scratching or buffering the disk substrate surface to provide circumferential anisotropy of the magnetic domains. Thereafter, the magnetic material is deposited on the circumferentially treated surface using known plating and/or sputtering technology.

Past and present data storage media have been manufactured in an ultra clean environment requiring Class 100, or better, clean rooms. Workers are required to be garmented wearing gloves, masks, hoods, smocks, and booties. Hard disk drive media is tested for electrical performance and number of errors (defects) before leaving the clean room. The media is placed in a sealed container in the clean room for shipment to the drive manufacturer.

The disk drive manufacturer must exercise similar clean room conditions in order to avoid damaging or contaminating the medium. Contamination or damage to the medium will cause an unacceptable error rate for the disk drive. To further insure data integrity, the drive manufacturer mounts the heads and medium, commonly called a head/disk assembly, inside a sealed disk drive cavity. As the medium rotates, it generates airflow over the head/disk assembly. Particles or contamination inside the drive are captured by filters located within the air flow. Capillary tubes and/or breather filters located in the lid of disk drive are used to equalize pressure and prevent moisture from entering the head/disk assembly.

The magnetic head(s) that perform the read/write operations can indent, mark or damage the medium through shock, vibration or improper head/medium design. The medium layers are very thin and fragile, on the order of a few microinches thick, and can be easily destroyed by mechanical damage imposed by the head. Non-operating environmental conditions, such as those normally found outside a clean room or outside a disk drive, can also easily render the medium unusable. Some of these major concerns which adversely affect medium quality and usability are:

(a) Moisture, which can cause the Cobalt in the high coercive force magnetic layer to corrode which causes the medium surface to flake off or pit and compromise medium performance;

(b) Chemical contamination from out gassing of internal head/disk assembly components such as uncured epoxy and plasticizers from gaskets, and such chemical contamination can cause the head to stick to the media surface resulting in stopping the drive from spinning or causing a head/disk crash resulting in substantial loss of data;

(c) Particles inside the drive which can cause a head crash that can damage the medium beyond use; (d) Handling damage by the disk or drive manufacturer including finger prints, scratches, and indentations which can cause nonreversible loss of data;

(e) Shock and vibration from improper drive design or use can cause a head crash that damages the medium beyond use; and (f) Poorly designed drives can fail during drive power up cycles due to high stiction, friction, temperature/humidity conditions or improper lubricant conditions.

A hard disk drive medium has no direct means to prevent demagnetization by stray magnetic fields should the drive medium be exposed to a stray field having sufficient magnetic field strength to erase the recorded data. Further, no surface of hard disk drive medium readily permits cleaning, and there are no known commercial hard disk drives that provide a means to clean the medium. For example, fingerprints cannot easily be removed from the surface of a hard disk drive medium.

Further, any attempts to use a hard disk drive magnetic medium outside of its intended clean and protected environment has been unsuccessful for a number of reasons, such as those discussed above.

As the demand for improved portable cards having increased memory storage capacity, such as credit cards, non-financial cards, transaction cards and the like increases, the driving factor as to the likely success or failure of an improved card is directly related to: (a) the storage densities available in such a card for storing and retrieving data; (b) the integrity of the magnetically encoded data in such a card; and (c) its ability to resist mechanical, chemical and magnetic degradation in an unprotected environment; such as in an ambient natural atmosphere operating environment in which financial and non-financial cards are used.

The magnetic disk media in known rigid disk drives are not designed to withstand even the most minor surface damage or degradation. The magnetic disk media for use inside the profoundly clean disk drive has a very hard but thin overcoat or protective layer. That overcoat or protective layer is typically diamond-like carbon on the order of 50 Angstroms to 300 Angstroms thick and is primarily used to control corrosion of the underlying cobalt based high coercivity layer. The underlying magnetic high coercivity film is also very thin, in the order of 150 to 500 Angstroms.

Since the protective layer includes at least one layer of a highly magnetic permeable material, the added thickness of this highly magnetic permeable material does not appear to increase the magnetic separation loss during read back as reported in U.S. Pat. No. 5,041,922.

The most prevalent type of media construction for use in hard disk drives is an aluminum substrate with a thick layer of Nickel Phosphor plated on the surface for polishing. This is an underlayer to the high coercivity magnetics. The Nickel Phosphor layer is typically 10 to 12 microns thick and is used to provide a material that can be subsequently polished to a smoother finish than the aluminum surface.

Hard disk drive media substrate range in thickness from 0.020 inches to 0.050 inches. Thinner substrates are desirable in order to be able to package more disks in the disk drive but have the problem of mechanical flutter, especially at high RPM. None of these substrates are bendable. A large bend radius of 20 inches will result in permanent deformation of the disk. A bend radius of less than 20 inches will result in permanent deformation as well as fracturing of the thick Nickel Phosphor layer. This fracturing of the Nickel Phosphor will propagate through the high coercivity magnetic layer rendering the media useless as a storage device.

No thick Nickel Phosphor underlayer is used on the portable card of the present invention. Therefore, fracturing problems associated with a thick Nickel Phosphor are avoided.

The portable card structure allows a card to be bendable to a degree depending upon the thickness and material of the substrate. For example, on one extreme are thick cards having a substrate formed of Zirconium. Such cards are 0.020 inches thick and can be bendable to a radius of approximately 10 inches. Another type of card uses a plastic substrate. Such cards are 0.030 inches thick and are bendable to a radius of approximately 4 inches., A thin card, such as a card having a substrate, formed of stainless steel, which is in the order of 0.005 inches thick and are bendable to a radius in excess of 4 inches without fracturing or becoming permanently deformed.

The protective coating of the present invention can be used with such cards in all forms of data storage devices, data storage sections, data storage medium and recording mediums. The known prior art media used for disk drive including the unabradable, thin protective coatings are not capable of being used in such portable cards.

SUMMARY OF THE INVENTION

The present invention discloses and teaches a new, novel and unique magnetically encodeable card comprising a non-magnetic substrate having at least one surface. A thin film, high density magnetically coercive material is disposed on the substrate for storing magnetic signals. In the preferred embodiment, the coercive material axis of magnetization are oriented in a predetermined direction relative to the at least one surface of the substrate. Preferably, a non-magnetic material is disposed on the substrate for defining an exchange break layer.

A protective coating including a magnetically permeable, magnetically saturable storage material disposed on the substrate and is responsive through the exchange break layer to the coercive material axis of magnetization to produce a magnetic image field in a direction opposite to the predetermined direction. The protective coating is formed on the magnetic material layer and is a relatively hard, abradeable protective coating. The protective coating is selected to have a thickness between a maximum thickness which would materially attenuate magnetic signals passing between the magnetic material layer and a transducer and a minimum thickness enabling the protective coating to be abraded by usage in an natural, ambient atmosphere operating environment for removing therefrom a known quantity of the protective coating.

The protective coating is formed of a material which resists at least one of chemical, magnetic and controlled mechanical degradation of the data storage device. The protective coating may be formed of at least one layer, wherein the least one layer includes the magnetically permeable, magnetically saturable storage material.

In the alternative, the protective coating may have at least two layers wherein one of the at least two layers includes or comprises a magnetically permeable, magnetically saturable storage material and the other of the at least two layers includes a non-magnetic abrasion resisting layer formed on the one of the two layers.

In its broadest aspect, the invention resides in a data storage device comprising a substrate having at least one surface with at least one high density magnetically coercive material disposed on the substrate for storing magnetic signals. The magnetic material may be isotropic or anisotropic. Such materials are well known in the art. At least one layer formed of non-magnetic material, which functions as a decoupler or quantum effect insulator, may be disposed on the substrate for defining an exchange break layer. A protective coating is formed on the substrate and is selected to have a depth in a direction substantially normal to the exchange break layer to facilitate passage of magnetic signals, in an ambient natural atmospheric operating environment, through the protective layer to the coercive material having the axis of magnetization in the predetermined direction.

In addition, new and novel magnetic signal processing apparatus and methods are disclosed herein utilizing the novel the magnetic recording medium having a high density magnetically coercive material for storing magnetic signals with the coercive material axes of magnetization oriented in a predetermined direction and having a protective coating selected to have a thickness to facilitate passage of magnetic signals in an ambient natural atmospheric operating environment through the protective coating to the high density magnetic material and which resists at least one of chemical, magnetic and controllable mechanical degradation of the data storage device.

The prior art which utilizes magnetic strips in a portable cards including portable data storage card having relatively low storage limitations. These relatively low density storage limitations of the prior art magnetic stripes is overcome by use of a data storage device having the new, novel and unique recording medium based use of standard hard disk drive medium technology with a high coercive force layer, but wherein such use of this technology is in a new and novel manner, namely outside the disk drive protective enclosure and protected operating environment.

None of the known prior art anticipates, discloses, teaches or suggests portable cards including portable data storage cards using a recording medium based standard hard disk drive medium technology with a high coercive force layer using a novel protective layer having a selected thickness and wherein such use occurs outside the disk drive protective enclosure and in natural atmosphere and environment. This invention is clearly new, novel and unobvious to persons skilled-in-the-art for all of the reasons set forth herein.

Therefore, one advantage of the data storage device is that the data storage device is capable of reliable read and write operations after handling in a non-clean, normal environment.

Another advantage of the present invention is that several media form factors can be provided for use in such a portable card including a magnetically encodeable card of a standard credit card size which is capable of multiple read and write operations.

Another advantage of the present invention is that other portable card sizes-and configurations, such as rectangular, square or circular shaped, may utilitize the teachings of the present invention.

Another advantage of the present invention is that a portable card using such a data storage device can be provided with a memory capacity substantially greater than that of the conventional financial cards using a magnetic stripe.

Another advantage of the present invention is that a data storage device can be provided which can be processed in a manner similar to a standard financial credit card.

Another advantage of the present invention is that a data storage device can be provided which can be exposed to rough handling in a manner similar to a credit card.

Another advantage of the present invention is that a portable card utilizing the teachings of the present invention can be stored in a wallet and can be freely handled without concerns for contamination and without regard to whether or not the card is impervious to scratches stray magnetic fields, fingerprints and other types of damage which would cause a prior art hard disk medium to fail.

Another advantage of the present invention is that the data storage device including its use as a portable card or magnetically encodeable card may include a high permeability protection coating in combination with a protective coating to prevent stray weak to medium strength (e.g. all but the strongest) magnetic fields from demagnetizing and/or erasing the recorded data.

Another advantage of the present invention is that a data storage device is provided that is capable of reading and writing in a longitudinal, linear, arcuate, radial or circumferential pattern.

Another advantage of the present invention is that the data storage device utilizes a recording medium having a protective coating formed on the uppermost surface thereby permitting cleaning of a magnetically encodeable credit card by pressure pads, abrasive materials and chemicals without damage to the recording medium including the magnetic signals stored therein.

Another advantage of the present invention is that the data storage device can be utilized in a magnetic signal processing apparatus.

Another advantage of the present invention is that the data storage device may be used in a method of processing magnetic signals using a magnetic recording medium having a high density magnetically coercive material for storing magnetic signals with the coercive material axes of magnetization oriented in a predetermined direction and a protective coating as described herein.

Another advantage of the present invention is that a magnetic recording medium having a high density magnetically coercive material for storing magnetic signals with the coercive material axes of magnetization oriented in a predetermined direction utilizing the teachings of the present invention, including a protective coating as disclosed herein, may be used in a system having a magnetic transducer, a drive member and a magnetic control device having a bias field that interacts with a magnetically permeable, magnetically saturable storage material layer, generally known in the art as a "keeper" layer, which is used as the protective coating to enable magnetic signals to pass between the high density magnetically coercive material, through the protective coating and the exchange break layer and a transducer typically located in a data processing station.

BRIEF DESCRIPTION OF THE DRAWINGS

The foregoing and other advantages of this invention will be apparent from the following description of the preferred embodiment of the invention when considered with the illustrations and accompanying drawings, which include the following Figures:

FIG. 19 is a pictorial representation of yet another portable card utilizing the teachings of the present invention in the form of a magnetically encodeable credit card fabricated to have on the obverse side thereof a data storage device which covers substantially all of the obverse side area and wherein the data storage device has a plurality of magnetic tracks for providing at least five megabytes formatted of magnetic storage and wherein the converse side thereof contains a standard magnetic stripe area as used on a VISA® credit card shown by dashed lines;

FIG. 20 is a right end elevational view of the portable card of FIG. 19 showing by dashed lines the data storage device located on substantially all of the obverse side and the VISA® standard magnetic stripe area located on the converse side;

FIG. 21 is a pictorial representation of the portable card of FIG. 18 wherein the converse side thereof contains the VISA® standard magnetic stripe area and having on the obverse side thereof a data storage device which covers substantially all of the obverse side area;

FIG. 26 is a pictorial representation of still yet another embodiment of a portable card utilizing the teachings of the present invention in the form of a magnetically encodeable credit card fabricated to have on the obverse side a data storage device which covers in excess of one-half of the obverse side area and wherein the data storage device has a plurality of magnetic tracks for providing at least five megabytes formatted of magnetic storage and wherein the converse side thereof has, adjacent the top edge of the credit card, a standard magnetic stripe area as used on an AMEX® credit card shown by dashed lines and wherein optionally either the observe side or the converse side may contain indicia;

FIG. 27 is a right end elevational view of the portable card of FIG. 25 showing by dashed lines the data storage device located on the obverse side of the credit card and the AMEX® standard magnetic stripe area located on the converse side of the credit card;

FIG. 28 is a pictorial representation of still yet another embodiment of a portable card utilizing the teachings of the present invention in the form of a magnetically encodeable credit card fabricated to have on the obverse side a data storage device which covers in excess of one-half of the obverse side area and wherein the data storage device has a plurality of magnetic tracks for providing at least five megabytes formatted of magnetic storage and wherein the converse side thereof has, adjacent the top edge of the credit card, a standard magnetic stripe area as used on a VISA® credit card shown by dashed lines and wherein optionally either the observe side or the converse side may contain indicia;

FIG. 29 is a right end elevational view of the portable card of FIG. 25 showing by dashed lines the data storage device located on the obverse side of the credit card and the VISA® standard magnetic stripe area located on the converse side of the credit card;

FIG. 40(A) is a pictorial representation of yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises one layer including a magnetically permeable, low coercivity layer of magnetic material separated which is separated from the high density magnetic material layer by the exchange break layer which enables a magnetic image field to be stored in the magnetically permeable, low coercivity layer, which recording medium is used for a data storage device;

FIG. 40(B) is a pictorial representation of still yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises two layers wherein one layer comprises a magnetically permeable, low coercivity layer of magnetic material separated which is separated from the high density magnetic material layer by the exchange break layer which enables a magnetic image field to be stored in the magnetically permeable, low coercivity layer and the other layer is disposed on the one layer is formed of a hard, diamond like material, which recording medium is used for a data storage device;

FIG. 40(C) is a pictorial representation of yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, a protective coating comprising two layers wherein one layer comprises a magnetically permeable, low coercivity layer of magnetic material separated which is separated from the high density magnetic material layer by the exchange break layer which enables a magnetic image field to be stored in the magnetically permeable, low coercivity layer and the other layer is disposed on the one layer is formed of a hard, diamond like material and a layer defining a bonded lubricant formed on the other layer of the protective coating, which recording medium is used for a data storage device;

FIG. 40(D) is a pictorial representation of still yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises one layer including a magnetically permeable, low coercivity layer of magnetic material separated which is separated from the high density magnetic material layer by the exchange break layer which enables a magnetic image field to be stored in the magnetically permeable, low coercivity layer, and a protection coating formed on the other side of the substrate opposite to the surface having the high density magnetic material layer deposited thereon, which recording medium is used for a data storage device;

DESCRIPTION OF THE PREFERRED EMBODIMENT

Figure 1:
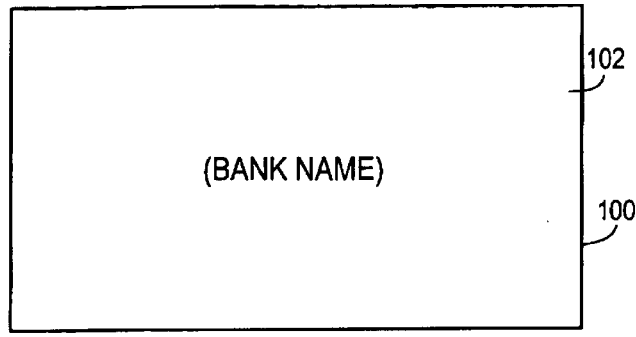
FIG. 1 is a pictorial representation of a prior art AMEX® credit card fabricated from polyvinyl chloride having indicia providing bank/user information on the front or obverse side thereof.
Figure 4:
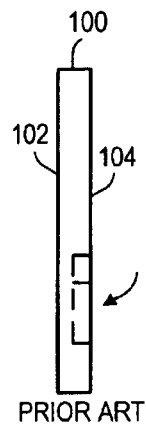
FIG. 4 is a left end elevational view of the prior art AMEX® credit card of FIG. 2 showing by dashed lines the standard magnetic stripe areas.
Figure 2:
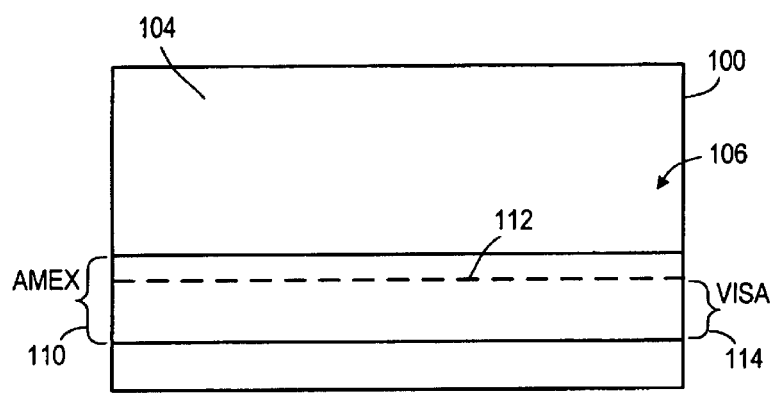
FIG. 2 is a pictorial representation of the prior art AMEX® credit card of FIG. 1 showing the converse side thereof having either a standard read-only magnetic stripe area defining one or more magnetic tracks or a standard read-write magnetic stripe area defining two or more magnetic tracks.
Figure 3:
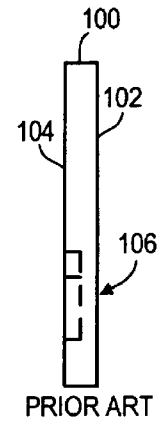
FIG. 3 is a right end elevational view of the prior art AMEX® credit card of FIG. 2 showing by dashed lines the standard magnetic stripe areas.

In this regard, FIGS. 1 through 7, labeled prior art, pictorially illustrate the presently used financial or credit cards. FIGS. 1 through 4 illustrate a credit card 100 where the obverse side 102 bears indicia describing certain bank/user information while the converse side 104, is illustrated in FIG. 2, includes a data storage section 106 which may be in the form of wide magnetic stripe area 110, which is typical of the magnetic stripe area used in a AMEX® credit card, which contains stored data in compliance with the AHSI Standards as described above.

Alternatively, the magnetic stripe area may be a thin magnetic strip area as depicted by dashed line 112 which forming a narrow stripe 114 which is typically used in a VISA® credit card.

Figure 7:
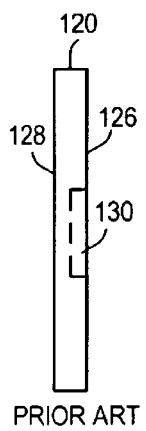
FIG. 7 is a left end elevational view of the prior art Smart card of FIG. 5 showing by dashed lines the standard magnetic stripe area.
Figure 5:
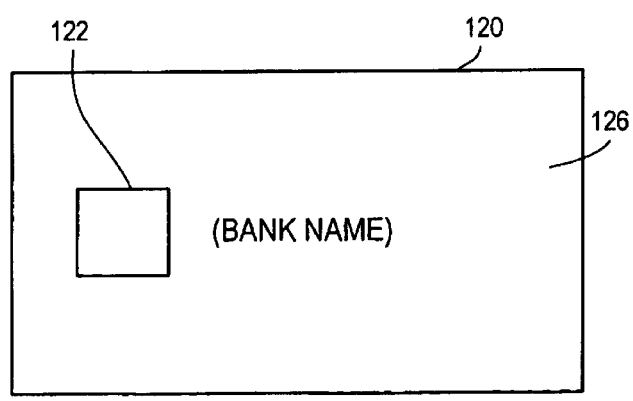
FIG. 5 is a pictorial representation of a prior art Smart card having a computer chip, memory and indicia providing bank/user information located on the front thereof.
Figure 6:
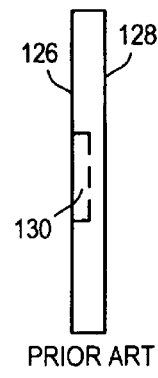
FIG. 6 is a right end elevational view of the prior art Smart card of FIG. 5 showing by dashed lines the standard magnetic stripe area.
Figure 10:
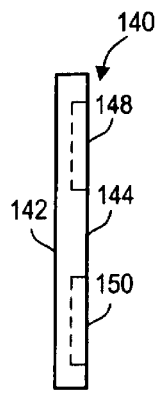
FIG. 10 is a left end elevational view of the credit card of FIG. 8 showing by dashed lines the magnetic stripe areas.

FIGS. 5 through 7 illustrate a typical Smart Card 120 having an integrated circuit shown as 122 located on the obverse side 126 thereof. The integrated circuit 122 may include a dedicated storage member. The converse side 128 of the Smart Card 120 may be blank or alternatively may include a magnetic stripe area similar to magnetic stripe areas 110 and 114 as illustrated in FIG. 2.

In FIGS. 6 and 7, the integrated circuit 122 is illustrated by dashed lines. If a magnetic stripe area is used on the Smart Card 120 the magnetic stripe area is typically located on the converse side 128.

The pictorial representation of a portable card 140, as shown in FIGS. 8, 9 10 and 11, utilize the teachings of the present invention in the form of a magnetically encodeable credit card fabricated from polyvinyl chloride or polyvinyl chloride acetate. The portable card 140 has a obverse side 142 and a converse side 144. The converse side 144 has two spaced parallel magnetic stripe areas shown as magnetic stripe areas 148 and 150. Each magnetic stripe area 148 and 150 are capable of having a plurality of magnetic tracks for providing at least five megabytes formatted of magnetic storage. Alternatively, one of the magnetic stripe areas 148 or 150, may be formatted for use as a standard magnetic stripe area on a financial credit card. Of course, the lower density application may not efficiently use the storage capability of the applicable magnetic stripe area.

Figure 8:
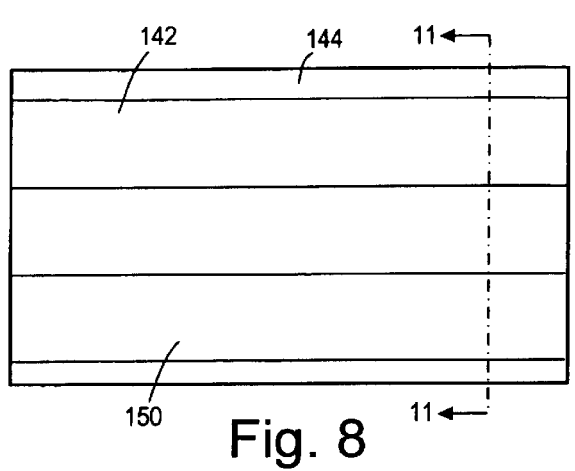
FIG. 8 is a pictorial representation of a portable card utilizing the teachings of the present invention in the form of a magnetically encodeable credit card fabricated from polyvinyl chloride or polyvinyl chloride acetate and having on the converse side thereof two spaced parallel magnetic stripe areas, each magnetic stripe area including the capability of having a plurality of magnetic tracks for providing at least five megabytes formatted of magnetic storage or, alternatively, for being used as a standard magnetic stripe area on a financial credit card.
Figures 9, 11:
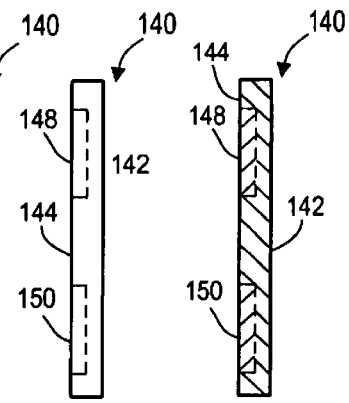
FIG. 9 is a right end elevational view of the credit card of FIG. 8 showing by dashed lines the magnetic stripe areas.
FIG. 11 is a sectional view taken along section lines 11—11 of the credit card of FIG. 8 showing by dashed lines the magnetic stripe areas.
Figure 12:
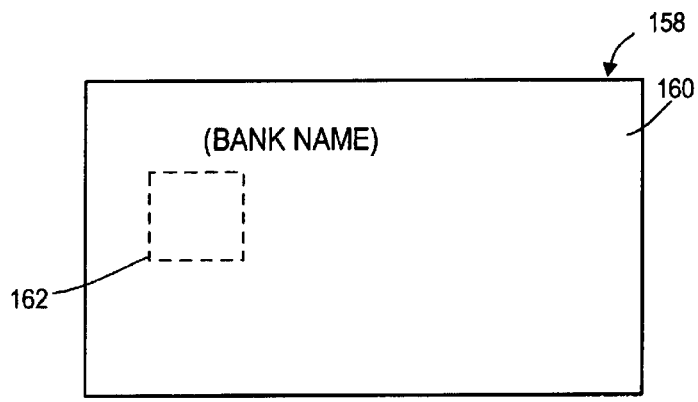
FIG. 12 is a pictorial representation of the obverse side of the credit card having indicia which may provide bank/user information shown thereon and which may include an integrated circuit as shown by dashed rectangle and the converse side thereof may have a single magnetic stripe area of the form depicted in FIG. 8.
Figure 13:
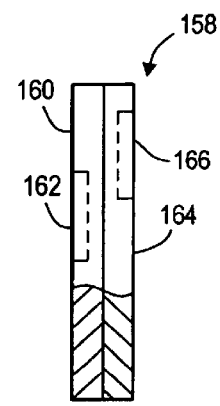
FIG. 13 is a partial right end elevational and sectional view of the credit card of FIG. 12 showing by dashed. lines the magnetic stripe area using the teachings of this invention and integrated circuit.

In the portable card 158 illustrated in FIGS. 12 and 13, the obverse side 160 of the card 158 may contain indicia which may provide bank/user information and may include an integrated circuit as shown by the dashed rectangle 162 and the converse side thereof 164 may have a single magnetic stripe area 166 of the form depicted in FIG. 8.

Figure 14:
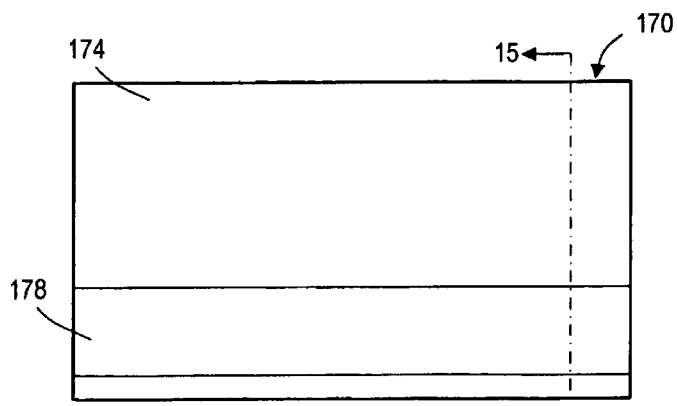
FIG. 14 is a pictorial representation of another embodiment of a portable card utilizing the teachings of the present invention in the form of a magnetically encodeable credit card fabricated from polyvinyl chloride or polyvinyl chloride acetate and having on the converse side thereof a magnetic stripe area having a plurality of magnetic tracks for providing at least five megabytes of formatted of magnetic storage.
Figure 15:
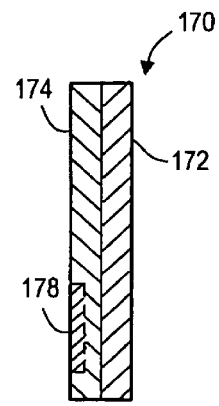
FIG. 15 is a right end elevational view of the credit card of FIG. 14 showing by cross-hatching lines the magnetic stripe area.

In the portable card of FIGS. 14 and 15, the portable card has an obverse side 172 and a converse side 174. The portable card 170 is in the form of a magnetically encodeable credit card fabricated from polyvinyl chloride, or other equivalent operable material, such as for example PVCA. The converse side 174 has a magnetic stripe area 178 having a plurality of magnetic tracks for providing at least five megabytes of formatted of magnetic storage. The obverse side 172 may be used for providing indicia or for other uses as described herein.

Figures 16, 17:
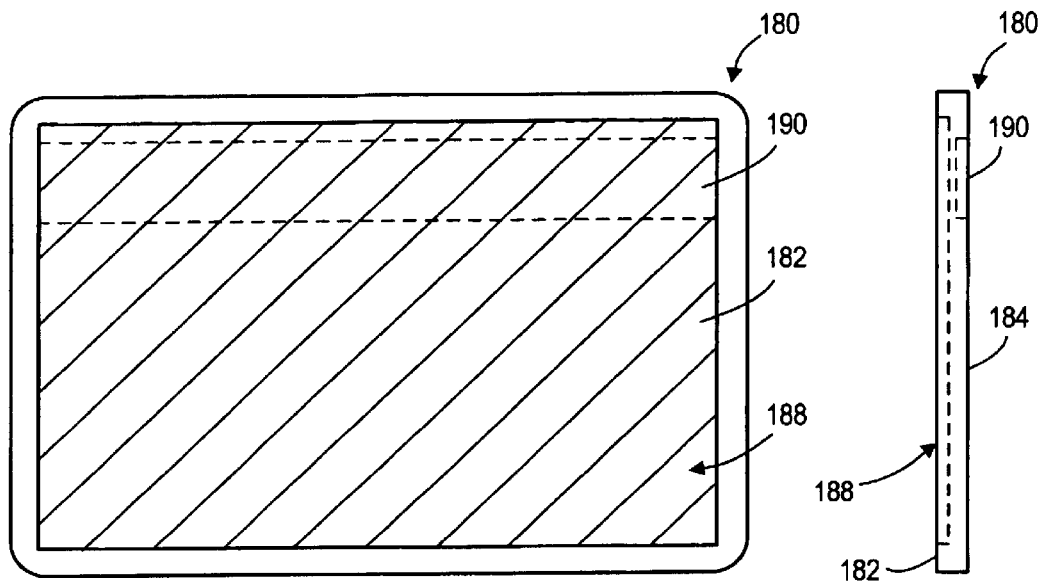
FIG. 16 is a pictorial representation of yet another portable card utilizing the teachings of the present invention in the form of a magnetically encodeable credit card fabricated to have on the obverse side thereof a data storage device which covers substantially all of the obverse side area and wherein the data storage device has a plurality of magnetic tracks for providing at least five megabytes formatted of magnetic storage and wherein the converse side thereof contains a standard magnetic stripe area as used on an AMEX® credit card shown by dashed lines.
FIG. 17 is a right end elevational view of the portable card of FIG. 16 showing by dashed lines the data storage device located on substantially all of the obverse side and the AMEX® standard magnetic stripe area located on the converse side.
Figure 18:
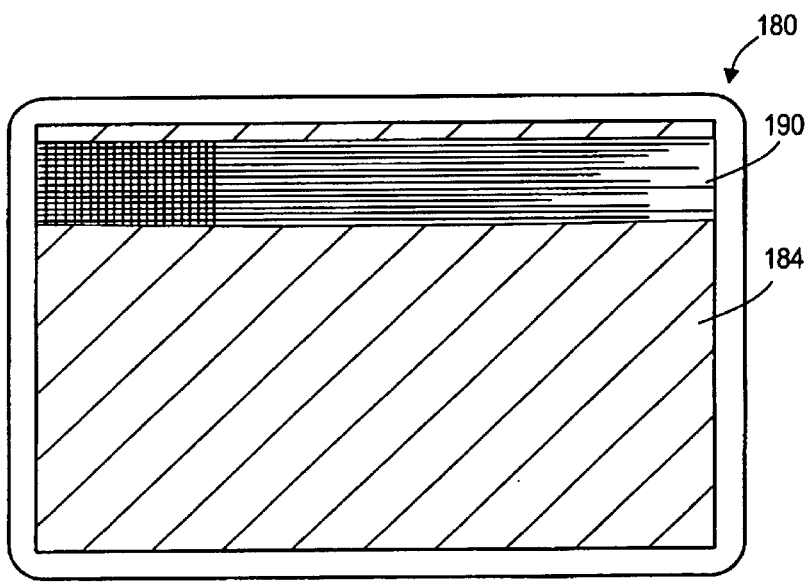
FIG. 18 is a pictorial representation of the portable card of FIG. 16 wherein the converse side thereof contains the AMEX® standard magnetic stripe area and having on the obverse side thereof a data storage device which covers substantially all of the obverse side area.

FIGS. 16, 17 and 18 depict a pictorial representation of yet another embodiment of a portable card 180 utilizing the teachings of the present invention. The portable card 180 has an obverse side 182 and a converse side 184. The obverse side 182 has formed thereon a data storage device shown by arrow 188, which covers substantially all of the obverse side area of obverse side 182. The data storage device 188 has a plurality of magnetic tracks for providing at least five megabytes formatted of magnetic storage. The converse side 184 contains a standard magnetic stripe area as used on an AMEX® credit card shown by dashed lines 190. This enables the portable card 180, to be used as a magnetically encodeable credit card which is capable of being read using an AMEX® credit card reader or other standard financial credit card readers or standard financial magnetically encoded card processing apparatus.

Alternatively, a card reader or magnetic signal processing apparatus, adapted to read and/or write on the data storage device 188, may be used to process the magnetically encoded data.

FIGS. 19, 20 and 21 depict a pictorial representation of still yet another embodiment of a portable card 196 utilizing the teachings of the present invention. The portable card 196 has an obverse side 198 and a converse side 200. The obverse side 198 has formed thereon a data storage device shown by arrow 204, which covers substantially all of the obverse side area of obverse side 198. The data storage device 204 has a plurality of magnetic tracks for providing at least five megabytes formatted of magnetic storage. The converse side 200 contains a standard magnetic stripe area as used on an AMEX® credit card shown by dashed lines 210. This enables the portable card 196, to be used as a magnetically encodeable credit card which is capable of being read using a VISA® credit card reader or other standard financial credit card readers or standard financial magnetically encoded card processing apparatus.

Alternatively, a card reader or magnetic signal processing apparatus adapted to read and/or write on the data storage device 204 may be used to process the magnetically encoded data.

Figure 22:
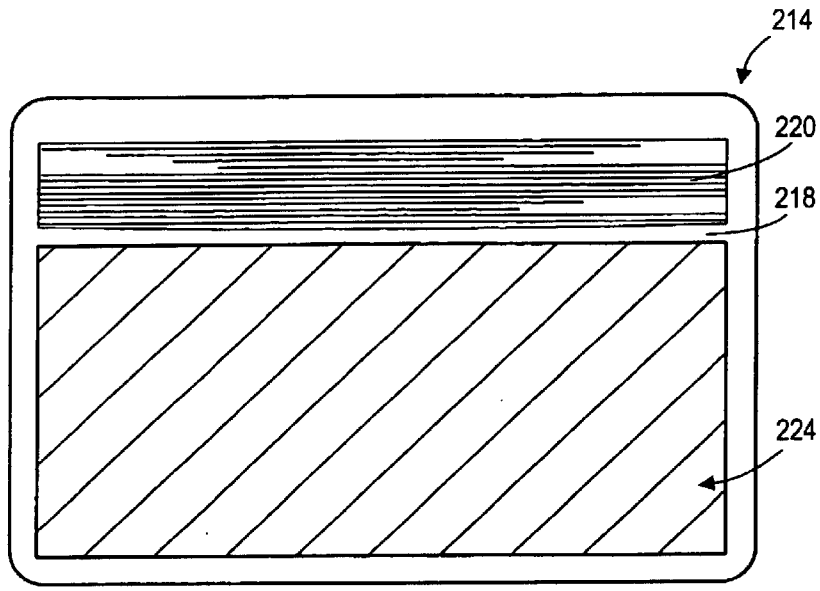
FIG. 22 is a pictorial representation of still yet another embodiment of a portable card utilizing the teachings of the present invention in the form of a magnetically encodeable credit card fabricated to have on the obverse side adjacent the top edge of the credit card a standard magnetic stripe area as used on an AMEX® credit card shown by dashed lines and located below the magnetic stripe area a data storage device which covers in excess of one-half of the obverse side area and wherein the data storage device has a plurality of magnetic tracks for providing at least five megabytes formatted of magnetic storage and wherein the converse side thereof may contain indicia.
Figure 23:
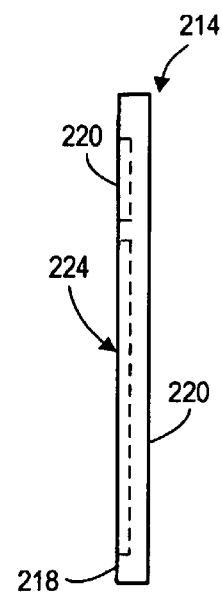
FIG. 23 is a right end elevational view of the portable card of FIG. 22 showing by dashed lines the AMEX® standard magnetic stripe area and the data storage device, both of which are located on the obverse side and the credit card.

FIGS. 22 and 23 depict a pictorial representation of still yet another embodiment of a portable card 214 utilizing the teachings of the present invention in the form of a magnetically encodeable credit card fabricated in a substantially rectangular shape and having substantially planar sides including an obverse side 218 and converse side 220. The obverse side 218, adjacent the top edge of the credit card 214, has a standard magnetic stripe area as used on an AMEX® credit card shown by dashed lines 220. Located below the magnetic stripe area 220 is a data storage device shown by arrow 224 which covers in excess of one-half of the obverse side area of obverse side 218. The data storage device 224 has a plurality of magnetic tracks for providing at least five megabytes formatted of magnetic storage. The converse side 220 may contain indicia or be utilized for other uses as described herein.

Figure 24:
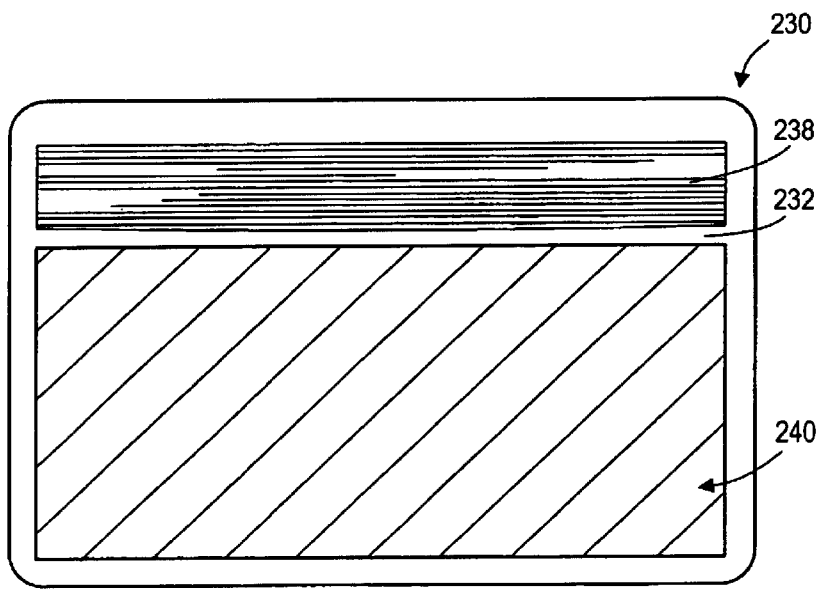
FIG. 24 is a pictorial representation of still yet another embodiment of a portable card utilizing the teachings of the present invention in the form of a magnetically encodeable credit card fabricated to have on the obverse side adjacent the top edge of the credit card a standard magnetic stripe area as used on an VISA® credit card shown by dashed lines and located below the magnetic stripe area a data storage device which covers in excess of one-half of the obverse side area and wherein the data storage device has a plurality of magnetic tracks for providing at least five megabytes formatted of magnetic storage and wherein the converse side thereof may contain indicia.
Figure 25:
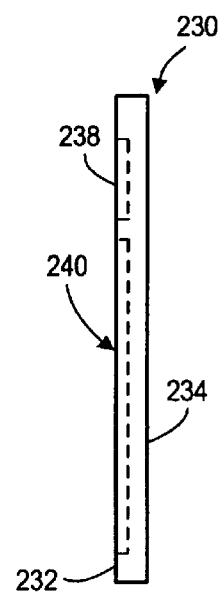
FIG. 25 is a right end elevational view of the portable card of FIG. 24 showing by dashed lines the VISA® standard magnetic stripe area and the data storage device, both of which are located on the obverse side and the credit card.

FIGS. 24 and 25 depict a pictorial representation of still yet another embodiment of a portable card 230 utilizing the teachings of the present invention in the form of a magnetically encodeable credit card fabricated in a substantially rectangular shape and having substantially planar sides, obverse side 232 and converse side 234. The obverse side 232 adjacent the top edge of the credit card 230 has a standard magnetic stripe area as used on an VISA® credit card shown by dashed lines 238. Located below the magnetic stripe area 238 is a data storage device shown by arrow 240 which covers in excess of one-half of the obverse side area of obverse side 232. The data storage device 240 has a plurality of magnetic tracks for providing at least five megabytes formatted of magnetic storage. The converse side 234 may contain indicia or be utilized for the FIGS. 26 and 27 depict a pictorial representation of still yet another embodiment of a portable card 246 utilizing the teachings of the present invention in the form of a magnetically encodeable credit card fabricated in a substantially rectangular shape and having substantially planar sides including an obverse side 250 and converse side 252. The obverse side 250 has formed on the lower portion thereof a data storage device shown by arrow 258 which covers in excess of one-half of the obverse side area of obverse side 250. The data storage device 258 has a plurality of magnetic tracks for providing at least five megabytes formatted of magnetic storage.

Located on the converse side 252 and adjacent the top edge of the credit card 246 is a standard magnetic stripe area as used on an AMEX® credit card shown by dashed lines 262. The converse side 252 may contain indicia or be utilized for other uses as described herein.

FIGS. 28 and 29 depict a pictorial representation of still yet another embodiment of a portable card 266 utilizing the teachings of the present invention in the form of a magnetically encodeable credit card fabricated in a substantially rectangular shape and having substantially planar sides including an obverse side 270 and converse side 272. The obverse side 270 has formed on the lower portion thereof a data storage device shown by arrow 278 which covers in excess of one-half of the obverse side area of obverse side 270. The data storage device 258 has a plurality of magnetic tracks for providing at least five megabytes formatted of magnetic storage.

Located on the converse side 272 and adjacent the top edge of the card 266 is a standard magnetic stripe area as used on an VISA® credit card shown by dashed lines 282. The converse side 272 may contain indicia or be utilized for other uses as described herein.

Figures 30, 31:
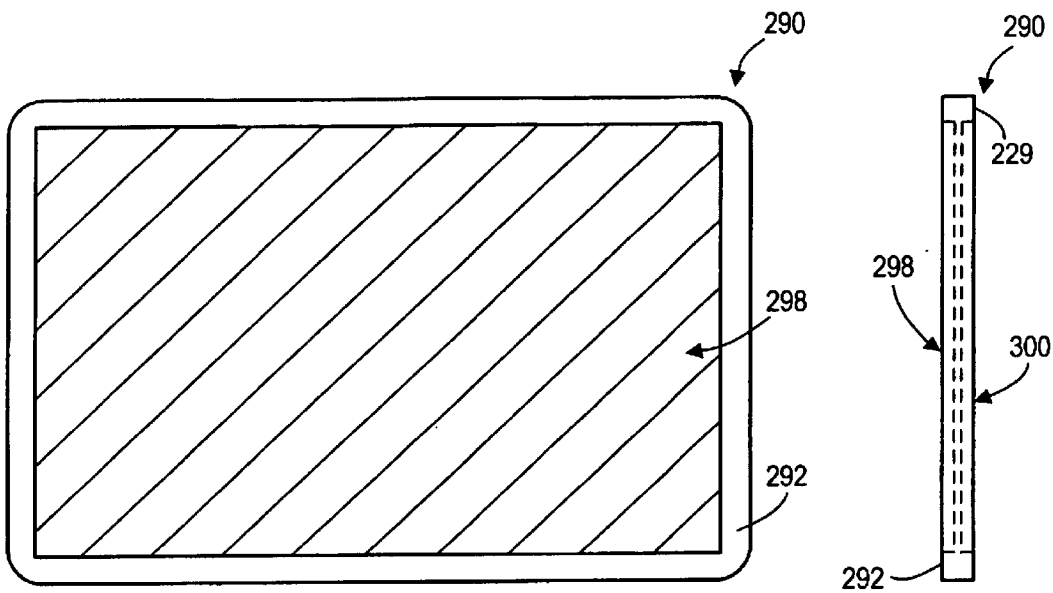
FIG. 30 is a pictorial representation of still yet another embodiment of a portable card utilizing the teachings of the present invention in the form of a magnetically encodeable credit card wherein the obverse side thereof is shown and wherein both the obverse side and converse side thereof each include a data storage device which covers substantially all of the area of the applicable side and wherein each data storage device has a plurality of magnetic tracks for providing at least five megabytes formatted of magnetic storage.
FIG. 31 is a right end elevational view of the portable card of FIG. 30 showing by dashed lines the data storage devices located on both the obverse side and converse side.
Figure 32:
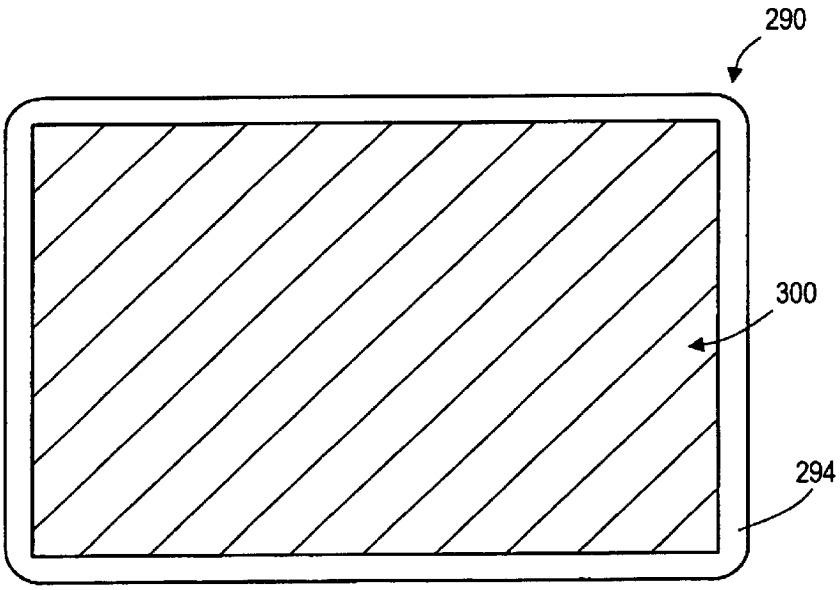
FIG. 32 is a pictorial representation of the portable card of FIG. 30 wherein the converse side thereof is shown and wherein both the obverse side and converse side thereof each include a data storage device which covers substantially all of the area of the applicable side and wherein each data storage device has a plurality of magnetic tracks for providing at least five megabytes formatted of magnetic storage.

FIGS. 30, 31 and 32 depict a pictorial representation of still yet another embodiment of a portable card 290 utilizing the teachings of the present invention. The portable card 290 has an obverse side 292 and a converse side 294. The obverse side 292 has formed thereon a data storage device shown by arrow 298, which covers substantially all of the obverse side area of obverse side 292.

The converse side 294, likewise, has formed thereon a separate or second data storage device shown by arrow 300, which covers substantially all of the converse side area of converse side 294.

Each of the data storage devices 298 and 300 has a plurality of magnetic tracks for providing at least five megabytes formatted of magnetic storage. It is envisioned that one of the data storage devices 298 and 300 may be formatted for use in a manner similar to a standard magnetic stripe area on a financial card of financial credit card. Of course, the lower density application may not efficiently use the storage capability of the data storage devices 298 and 300.

There are a number of methods available to fabricate a portable card at a magnetically encodeable credit card utilizing the teaching of the present invention. FIGS. 33, 34, 35 and 36 are exemplary of several methods and structures for the teachings of the present invention. The structure, composition and thickness of the recording medium and protective coating may dictate which structure is the best embodiment for using the teachings of the present invention.

The methods and structures set forth below are not intended to be limiting and are being provided as examples only. It is envisioned that presently known alternative technologies or after developed technologies which are equivalent to the known technologies, may be used in practicing the invention set forth herein. In FIGS. 33 through 36, common elements are identified with the same numerals.

Figure 33:
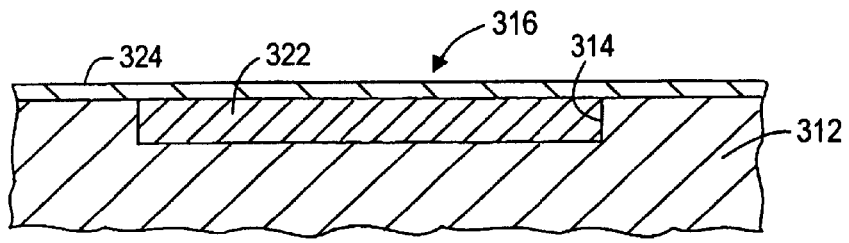
FIG. 33 is a pictorial representation of a credit card having a groove formed therein for receiving a data storage device wherein a data storage member is located in the groove and the data storage member and groove are enclosed by a protective coating of material which may be one or more layers of material.

FIG. 33 is a pictorial representation of one structure for a portable card formed of a substrate 312, which may be any known material for use as substrate for a recording medium including glass, ceramic or the like or other non-magnetic material. The substrate 312 has a groove 314 formed therein. Certain of the materials defining the remaining structure of the data storage device including the protective coating are shown generally by arrow 316. The materials disposed in the groove 314, excepting the protective coating, are depicted by 322 and define a data storage section or recording medium. The materials 322, the surface of substrate 312 and the groove 316 are enclosed by the protective coating 324 which may be one or more layers of material as disclosed herein.

Figure 34:
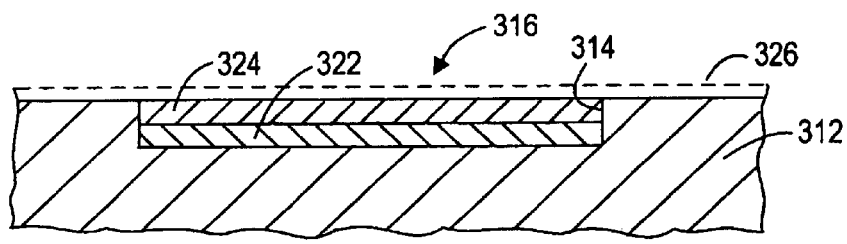
FIG. 34 is a pictorial representation of a credit card having a groove formed therein for receiving a data storage device comprising a data storage member and a protective coating of material enclosing the data storage member wherein both the data storage member and protective coating are located within the groove.

FIG. 34 is a pictorial representation of another structure for a portable card formed of a substrate 312. The substrate 312 has a groove 314 formed therein. Certain of the materials defining the remaining structure of the data storage device including the protective coating are shown generally by arrow 316. The materials, except for the protective coating, are depicted by 322 and the materials 322 are disposed in the groove 314 together with the protective coating 324. An overcoat layer or bonded lubricant layer, depicted by dashed line 326, may be applied to the outer surface of the substrate enclosing the protective coating 324, the layers of material 322 and the outer surface of the substrate 312.

Figure 35:
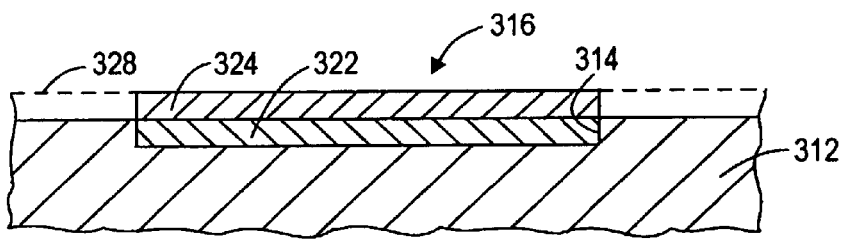
FIG. 35 is a pictorial representation of a credit card having a groove formed therein for receiving a data storage device wherein the data storage member is enclosed by a protruding protective coating of material located directly thereon and wherein a laminating layer material is formed to be coplanar with the protruding protective coating.

FIG. 35 is a pictorial representation of yet another structure for a portable card formed of a substrate 312. The substrate 312 has a groove 314 formed therein. Certain of the materials defining the remaining structure of the data storage device including the protective coating are shown generally by arrow 316. The materials, except for the protective coating, are depicted by 322 and the materials 322 are disposed in the groove 314. The protective coating 324 is a protruding protective coating of material located directly on and enclosing the layers of material 322. A laminating layer material depicted by dashed line 328 is formed to be coplanar with the protruding protective coating 324.

Figure 36:
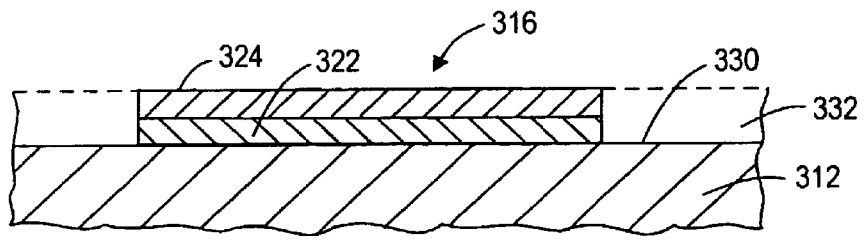
FIG. 36 is a pictorial representation of a credit card having a data storage device formed on the surface thereof wherein both a data storage member and a protective coating of material enclosing the data storage member are both protruding above the surface of the credit card and wherein a laminating layer material is formed to be coplanar with the protruding data storage member and protruding protective coating.

FIG. 36 is a pictorial representation of still yet another structure for a portable card formed of a substrate 312. The substrate 312 receives certain of the materials defining the remaining structure of the data storage device, and those certain materials including the protective coating are shown generally by arrow 316. These materials, except for the protective coating, are depicted by 322 and are disposed on and protrude above the surface 330 of substrate 312. The protective coating 324 is located directly on and enclosing the layers of material 322 and the protective coating 324 is likewise a protruding layer of material. A laminating layer material depicted by dashed line 332, which optionally may be the same material as the protective coating, is formed to be coplanar with the protruding layers of material 322 and the protective coating 324.

Figure 37:
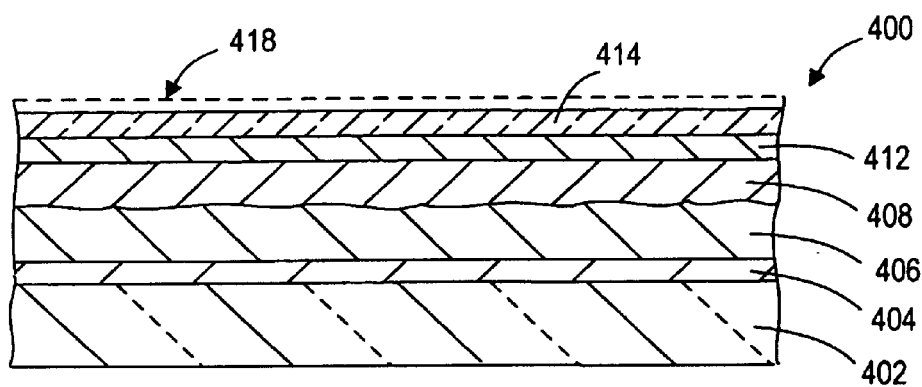
FIG. 37 is a pictorial representation of a prior art recording medium having a high density magnetic material having its axis of magnetization extending in a substantially horizontal direction relative to at least one surface of the substrate, which recording media is used for a data storage device operating in a protective environment, and to which a protective coating as disclosed herein can be added to use the same in a data storage device of the present invention.

FIG. 37 is a pictorial representation of a prior art recording medium 400 having substrate 402, a Ti Seed Layer 404 (having a thickness of approximately 100 Angstroms), a layer 406 of NiP having formed around a layer 408 of Cr, a high density magnetic material layer 412 having its axis of magnetization extending in a substantially horizontal direction relative to at least one surface of the substrate 402, and wherein the layer 412 is coated or sealed with a glass or PLC coating 414. The recording medium 400 is exemplary of the type of recording medium used for a data storage device operating in a protective environment.

Typically in a data storage device such as a disk drive operating in a protective environment, particles get inside disk drives from poor prior cleaning, surface abrasion created from the head landing on the media landing zone, and peaks of carbon extending above the head flying height that are severed or broken off by the flying head.

The typical sizes of particles that are common to hard disk drives are larger that the flying height which is typically 1 microinch to 10 microinches. These particles can easily become lodged between the head and the disk. The particles lift the head up and away from the disk. The particles plow through or penetrate the overcoat or protective layer and impact on the high coercivity recording layer, resulting in complete destruction of the recorded data track. This is commonly know as a "head crash". The particles generated by the "head crash" can rapidly spread throughout the disk drive causing an avalanche of "head crashes" on the other disks, if a multidisk drive.

On the other hand, the recording medium of the present invention has been intentionally designed to be exposed to and to tolerate mechanical degradation of the surface without any degradation of the underlying high coercivity recording layer. The head or transducer operating as the read/write device on medium or data storage device of this invention can either operate in absolute contact with the outer surface of the protective coating or can "fly" in "quasi" contact to 10 microinches above the outer surface of the protective coating.

The selected thickness and relative hardness of the protective coating permits substantial abrasion due to particulate contamination during read/write operation in a normal ambient atmosphere operating environment as well as during abrasive cleaning, where the outer surface of the protective coating may be abraded. The protective coating has been designed to abrade away upon impact with particulate matter including particles occurring between the head and media and during cleaning and handling leaving the underlying high coercivity recording material intact.

In the present invention, a relatively hard, abradeable protective coating is formed on the magnetic material layer and the selected thickness of the protective layer is an important criteria for rendering this invention operable. The thickness is selected to be between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating.

As such, the protective coating in the preferred embodiment is a bendable, diamond-like hardness protective coating having a selected thickness which allows passage of magnetic signals in an ambient natural atmospheric operating environment through the protective layer and between said at least one high density magnetically coercive material layer and a transducer and is formed of a material which resists at least one of chemical, magnetic and controlled mechanical degradation of the data storage device.

Figure 38:
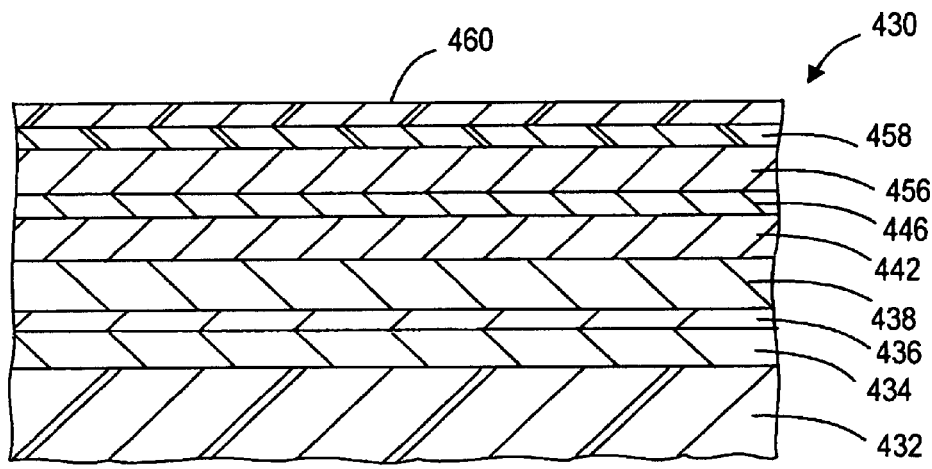
FIG. 38 is a pictorial representation of one embodiment of a recording medium of the present invention having a high density magnetic material having its axis of magnetization extending in a substantially horizontal direction relative to at least one surface of the substrate and a plurality of layers of the materials including a protective coating having a magnetically permeable, low coercivity layer of magnetic material separated by a layer of non-magnetic material defining an exchange break layer which enables a magnetic image field to be stored in the magnetically permeable, low coercivity layer, which recording medium is used for a data storage device.

FIG. 38 is a pictorial representation of one embodiment of a recording medium shown generally as 430 which is formed of a plurality of layers of material to provide the most ideal recording medium possible for practicing this invention. The recording medium 430 has a substrate 432 which functions as the portable card substrate. A base layer 434 is deposited on the substrate 432. A seed layer 436, which may be optional, is deposited on the base layer 434 a layer 438 formed of chromium is deposited on the seed layer 436. A layer 442 of high density magnetic material having its axis of magnetization extending in a substantially horizontal direction relative to at least one surface of the substrate 432 is deposited on the chrome layer 438. A layer 446 of non-magnetic material, which functions as a "break layer", "exchange break layer" or a "decoupling layer", is deposited on the magnetic layer 442. A protective coating shown by bracket 454 is applied to the layer 446. The protective coating 454 is formed of two layers, namely a magnetically permeable, low coercivity layer 460, which is deposited on the layer 446 to form a "keeper" layer, and a second layer 458 which preferably is a hard, diamond like material.

The structure, function and operation of a "keeper" layer and other known prior art relating to a "keeper" layer is described in PCT Application US92/10485 filed Dec. 7, 1992 and published on Jul. 8, 1993.

The protective coating 454 may have formed thereon a bonded lubrication layer 460 which functions as a cleaning material layer permitting the cleaning of debris, fingerprints and other particulate material from the surface of the recording medium 430.

Figure 39:
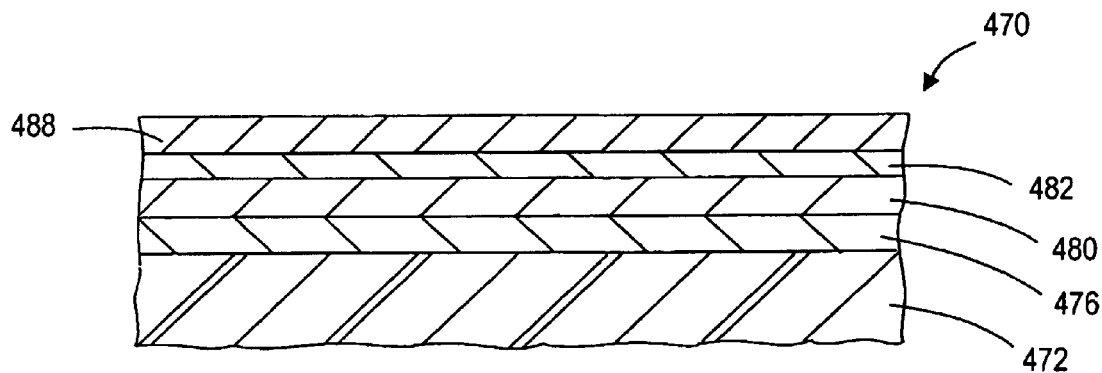
FIG. 39 is a pictorial representation of another embodiment of a recording medium of the present invention having an underlayer deposited on at least one surface of a substrate deposited, a high density magnetic material layer deposited on the underlayer wherein the high density magnetic material has its axis of magnetization extending in a substantially horizontal direction relative to at least one surface of the substrate, a layer of non-magnetic material defining an exchange break layer, and a protective coating including a magnetically permeable, low coercivity layer of magnetic material separated which is separated from the high density magnetic material layer by the exchange break layer which enables a magnetic image field to be stored in the magnetically permeable, low coercivity layer, which recording medium is used for a data storage device.

FIG. 39 is a pictorial representation of another embodiment of a recording medium 470 for practicing this invention. This structure represents a recording medium having a significantly less number of layers of material compared to the embodiment and structure described above in connection with FIG. 38.

A substrate 472, which is used as the portable card, has a chromium underlayer 476 deposited on at least one surface of the substrate 472. A high density magnetic material layer 480 is deposited on the underlayer 476 wherein the high density magnetic material layer 480 has its axis of magnetization extending in a substantially horizontal direction relative to at least one surface of the substrate 472. A layer of non-magnetic material 482 defining an exchange break layer is deposited on the magnetic layer 480. A protective coating 488, which is in the form of a single layer, includes a magnetically permeable, low coercivity magnetic material which is separated from the high density magnetic material layer 480 by the exchange break layer 482 which enables a magnetic image field to be stored in the magnetically permeable, low coercivity magnetic material forming the protective coating 488.

FIG. 40(A) is a pictorial representation of yet another embodiment of a recording medium 492 for practicing this invention. In this embodiment, the protective coating is a single layer and includes a magnetically permeable, low coercivity magnetic material which also functions as the "keeper" layer. The recording medium 492 includes a substrate 496 which is preferable formed of a non-magnetic material. A high density magnetic material layer 498 is deposited on the at least one surface of the substrate 496 wherein the high density magnetic material has its axis of magnetization extending in a substantially horizontal direction relative to at least one surface of the substrate 496. A layer 502 of non-magnetic material, defining an exchange break layer, is deposited on the magnetic layer 498. The protective coating 504 comprises one layer including a magnetically permeable, low coercivity layer of magnetic material which is separated from the high density magnetic material layer 498 by the exchange break layer 502. The exchange break layer 502 enables a magnetic image field to be stored in the magnetically permeable, low coercivity material.

In an unsaturated state, the magnetic permeable, magnetically saturable material, which may be use alone as protective coating, provides a shunt path that contains substantially all of the magnetic flux from the recorded data in the high coercivity layer. The effectiveness of the protecting coating becomes degraded at a thickness where the material commences to emit a detectable quantity of magnetic flux leakage.

Also, the protective layer minimum thickness due to known quantity of magnetically permeable, magnetically saturable material being removed by usage is that minimum thickness thereof which is capable of supporting magnetic flux density of a reading signal.

It is highly desirable that the magnetic flux from the data stored in the high coercivity magnetic layer is substantially retained in the magnetic permeable protective layer.

Upon application of a localized saturating flux, such as DC bias field, an electrical aperture is created in the magnetic permeable, magnetically saturable layer. The flux lines from a bit cell of data are now unconstrained, e.g., a state of high reluctance, and can extend outside the magnetic permeable protective layer and into interaction with a transducer for detection and subsequent data processing. Flux from all of the other bit cells remain substantially contained in the non-saturated magnetic permeability, magnetically saturable protective coating; e.g. a state of low reluctance. Relative motion between the medium and the transducer will "move" the localized saturated aperture in the magnetic permeable, magnetically saturable layer, forming the protective coating, to permit additional cells of data to be accessible by the read transducer.

In the preferred embodiment where the protective coating is a magnetic permeability, magnetically saturable material, substantial amounts of the magnetic permeable protection layer can be abraded or worn away by sliding transducer contact, by an abrasive cleaning, by removing or slighting abrading as required to remove debris, fingerprints and the like from the card or by rough handling without affecting the integrity of the data stored in the high coercivity data memory layer. In the preferred embodiment, the magnetic permeable protection layer may be formed from a wide variety of low coercivity, high permeability materials, materials typically used as core material in magnetic read/write transducers. Such materials include Permalloy (NiFe), Sendust (AlFeSil) and super Sendust (AlFeSilNi).

The thickness of the magnetic permeable protection layer should be sufficient to retain all of the flux from the high coercivity memory layer with some additional material to permit substantial mechanical wear while still containing the underlying magnetic flux. However, even if nearly all of the magnetic permeable protection layer is worn away to the thickness where a slight amount of flux leakage occurs, some retention of the underlying flux will still occur.

Mechanical damage to the high coercivity layer will not occur as long as some material in the protective layer remains intact. Because of the protective coating of the present invention being so robust and bendable, a very severe grinding action would be required to remove all of the protection layer, exposing the underlying break layer and high coercivity data recording layer.

When a magnetically encodeable card having a protective coating of the present invention is exposed to stray magnetic field, such as adjacent credits cards for example, the magnetic permeability, magnetically saturable material causes the magnetic filed to be captured with the saturable material thereby providing magnetic protection to the material storage layer.

Likewise the relatively hard protective coating , if immersed in a chemical solution or other fluid, which may contain chemicals, the protective coating protects the material storage layer from being degraded by such chemicals which come into contact with the data storage device.

The relatively hard, abradeable protective coating of the present invention is formed on the magnetic material layer. the protective coating and is selected to have a thickness between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating. The maximum thickness and minimum thickness can be empirically determined and are generally a function of the data storage device materials, the protective coating materials, the transducer and the like.

The protective coating may be a single layer which includes a magnetically permeable, magnetically saturable material or at least two layers wherein one of the layers include a magnetically permeable, magnetically saturable material and the other of the layers may be a non-magnetic friction reducing layer formed on the one of the layers.

The term "diamond-like hardness" is well known in the art and is described in detail at page 599 and pages 629 through 638 in *TRIBOLOGY AND MECHANICS OF MAGNETIC STORAGE DEVICES* by Bharat Bhushan published by Springer-Verlag of New York. Generally the term diamond-like hardness refers to an amorphous or diamond-like carbon (DLC) deposited by sputtering or plasma-enhanced chemical vapor deposition techniques that has been developed for applications, such as the magnetic thin-film disks, which require extremely low friction, and wear at a range of environmental conditions [inside the protected environment of the disk drive].

Figure 41A:
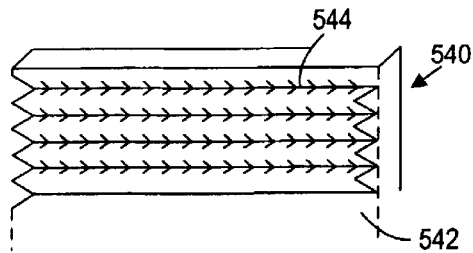
FIG. 41(A) is the pictorial representation of a recording medium of the present invention illustrating that the surface thereof is textured during the fabrication process of the recording medium to provide lineal antisotrophy of the magnetic domains.
Figure 41B:
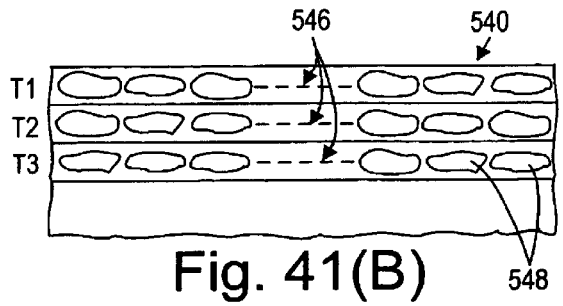
FIG. 41(B) is a pictorial representation of the recording medium of FIG. 41(A) having a plurality of magnetic tracks and illustrating that specific domain areas used for recording magnetic signals therein.

FIG. 41(B) is a pictorial representation of the recording medium 540 of FIG. 41(A) having a plurality of substantially parallel magnetic tracks 546 and illustrating that specific domain areas 548 are used for recording magnetic signals therein.

In FIG. 40(A), the recording medium is illustrated to interact with a magnetic control device shown by dashed rectangle 491 having a bias field shown by arrow 493 which is adapted to increase through the protective coating 504 and the and the exchange break layer 502 the reluctance of the magnetic saturable, magnetically permeable material in the protective coating 504 to enable the magnetic signals to pass between the high density magnetically coercive material through the exchange break layer 502 and the protective coating 504 to a magnetic transducer 495.

The magnetic transducer is typically forms part of or is located in a data processing station and is adapted to interact with the portable card containing the data storage device 492 when the portable card and data processing station are moved relative to each other to position the data storage device proximate the data processing station to enable data flow between the magnetic layer in the data storage device and the transducer.

The bias field 493 causes or drives the magnetic saturable, magnetically permeable material in the protective coating 504 into saturation enabling the magnetic signals to easily pass from the magnetic layer 498, through the exchange break layer 502 and the protective coating 504 to the transducer 495. The portion of the protective coating that does have the bias filed 493 applied thereto remains in an unsaturated condition and retains or keeps the magnetic signals encoded in the magnetic layer 498.

A drive member, depicted by rectangle 497, is operatively coupled to at least one of the transducer 495 and the portable card containing the recording medium 492 to provide the relative movement therebetween.

The drive member is used to perform one of the following: (i) position the portable card proximate the data processing station to enable data flow therebetween; (ii) move the portable card relative to the data processing station; (iii) move the data processing station relative to the portable card; and (iv) the portable card and the data processing station are moved relative to each other.

The transducer 495 maybe be: (i) an inductive head; (ii) a thin film magnetic head; (iii) a magnetoresistive head; (iv) a giant magnetoresistive (GMR) head, and (v) a magnetoresistive head including a dual stripe magnetoresistive element. In addition, the magnetoresistive head may include a magnetic flux guide shown by dashed line 499 in FIG. 40(A) for conducting magnetic flux from the data storage device of the portable card read by such a magnetoresistive head.

In FIG. 40(A), a programmable control device depicted by dashed box S01 is operatively connected to the magnetic control device 491 to cause the bias field 493 to be applied to the recording medium 492 when a selected magnetic image is located substantially adjacent the transducer 495. The use of such a programmable control device is known in the magnetic recording and reproducing art.

FIGS. 40(B), 40(C) and 40(D) are variations of the structure of FIG. 40(A) and the same numbers are used in each figure to identify similar elements for purposes of the following descriptions.

In FIG. 40(B), the structure of the recording medium 510 is substantially the same as that of the recording medium 492 of FIG. 40(A) except that the protective coating 504 is formed of two layers, one layer of which is a "keeper" layer 516 and the other of which is a layer 518 formed preferably of a hard, diamond like material.

In FIG. 40(C), the structure of the recording medium 522 is similar to that of the recording medium 510 of FIG. 40(B) except that an additional layer 528 of a bonded lubricant material is deposited on the layer 518. The bonded lubricant material may be any well known bonded lubricating material applicable for coating onto a recording medium, such as for example perflouroether or phosphozene.

In FIG. 40(D), the structure of the recording medium 532 is similar to that of FIG. 40(A) except that the protective coating 504 is applied to both the recording medium formed on the substrate, which coats one side of the substrate 496, and to the opposite side of the substrate 536.

Tables 2, 3, 4 and 5 set forth below provide examples of the various materials that can be used for various layers of materials as described in the embodiments of FIGS. 38, 39, 40(A), 40(B), 40(C) and 40(D), the thickness thereof and other important characteristics thereof. The examples set forth herein are not intended to be limiting in nature or teachings, but rather are examples of materials that can be used in practicing this invention. It is envisioned that other materials not disclosed herein, but which are known to persons skilled-in-the art, can also be used in practicing the present invention, and such materials as well, as any after developed material that are substantially equivalent to the materials disclosed herein, are deemed to be within or as using the teachings of the present invention.

Table 2 sets forth materials which can be used for the protective coating, "keeper layer", break layer and magnetic layer:

TABLE 2

| Protective Coating (Overlayer) | "Keeper Layer": | Break Layer | Magnetic Layer |
|---|---|---|---|
| Carbon Diamond Like | AlFeSil (Sendust) | Silicon | CoCrPtTa |
| Carbon | NiFe (Permalloy) | Carbon | CoCrPt |
| Zirconia | CoZrNb | Chromium | CoCrTa |
| Zirconia Oxide | | | CoNiCr |
| Glass | | | CoNiPt |
| | | | CoNiCrPt |

Table 3 sets forth materials which can be used for an Underlayer, Optional seed layer, Optional base layer and card substrate:

TABLE 3

| Underlayer | Optional Seed Layer | Optional Base Layer | Card Substrate |
|---|---|---|---|
| Typically Chromium | Crystalline CrNi Ta Aluminum Nitride CrTiO2 | NiP | Glass Zirconia Plastic Isotropic Plastic Ceramic/Alumina Glass Ceramic Glass Carbon Fiber Stainless Steel Titanium Aluminum Phosphor Bronze |

Table 4 sets forth the range in Angstroms, for the Overcoat thickness, the Keeper thickness, the break layer thickness and magnetic layer thickness, as determined in a direction substantially normal to the surface of the substrate:

TABLE 4

| Protective Coating (Overlayer) Thickness | Keeper layer Thickness | Break Layer Thickness | Magnetic Layer Thickness |
|---|---|---|---|
| 150 Angstroms to 500 Angstroms | 50 to 500 Angstroms | 10 Angstroms to 150 Angstroms | 250 Angstroms to 1000 Angstroms |

Table 5 sets forth the range in Angstroms, for the underlayer thickness, the seed layer thickness, the base layer thickness and card substrate, as determined in a direction substantially normal to the surface of the substrate:

TABLE 5

| Underlayer Thickness | Seed Layer Thickness | Base Layer Thickness | Card Substrate Thickness |
|---|---|---|---|
| 200 Angstroms to 2000 Angstroms | 100 Angstroms to 1000 Angstroms | Typically 10 Micro-meters | .005 inches to .050 inches |

The substrate surface may be treated by texturing to enhance orientation of anistropic materials. The known texturing procedures that can be used include: (i) circumferential texturing; (ii) radial texturing; (iii) chemical texturing; and (iv) laser texturing.

The pictorial representation in FIG. 41(A) depicts a recording medium of the present invention illustrating that the surface 542 thereof is textured, as represented by the substantial linear, parallel texture markings 544, during the fabrication process to provide lineal antisotrophy of the magnetic domains.

Figure 42A:
FIG. 42(A) is a pictorial representation of an encodeable credit card wherein the entire substrate or body is fabricated of a magnetic recording material and having a protective coating therearound forming a data storage device.
Figure 42B:
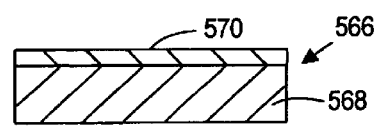
FIG. 42(B) is a pictorial representation of an encodeable credit card wherein the interior of the substrate or body thereof is formed of a high density recording material having a protective coating formed thereon for forming a data storage device.

In FIG. 42(A). the pictorial representation of an encodeable credit card 550 is shown wherein the entire substrate or body 562 is fabricated of a magnetic recording material in an appropriate binder material and having an appropriate protective coating 564 to form a data storage device using the teachings of the present invention;

FIG. 42(B) is a pictorial representation of an encodeable credit card 564 wherein the substrate or body 568 forms the high density magnetic recording material and a protective coating 570 is formed thereon to form a data storage device for practicing this invention.

Figure 43A:
FIG. 43(A) is a pictorial representation of a credit card having a groove formed therein which is adapted to have a data storage device comprising a recording medium having a protective coating formed therein.

FIG. 43(A) is a pictorial representation of a credit card 572 having a groove 574 formed therein which is adapted to have a data storage device having a separate substrate and a protective coating inserted therein.

Figure 43B:
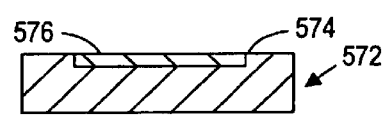
FIG. 43(B) is a pictorial representation of a credit card having a groove formed therein which encloses a data storage device wherein the data storage device may comprise a recording medium illustrated in FIGS. 38, 39, 40(A), 40(B), 40(C) and 40(D)

FIG. 43(B) is a pictorial representation of a the credit card 572 of FIG. 43(A) having wherein the groove 574 formed therein encloses a data storage device 576 wherein the data storage device may comprise a recording medium illustrated in FIGS. 38, 39, 40(A), 40(B), 40(C) and 40(D). In addition, prior art recording medium having a protective coating as described in connection with FIG. 37 may also be used in practicing this invention.

Figure 44:
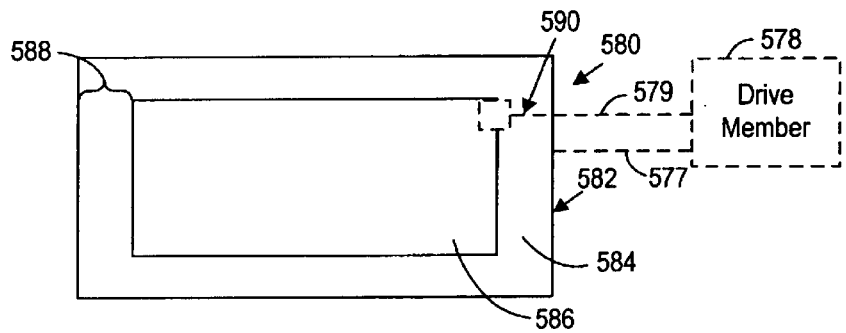
FIG. 44 is a pictorial representation of still yet another portable card utilizing the teachings of the present invention in the form of a magnetically encodeable credit card wherein the obverse side thereof may contain indicia providing banker/user information or, alternatively, a standard magnetic stripe area as shown in FIGS. 19, 20, 21, 26,27, 28 and 29 and the converse side thereof each include a data storage device having a plurality of parallel spaced magnetic tracks for storing at least five megabytes formatted of a magnetic data.

FIG. 44 is a pictorial representation of still yet another portable card 580 utilizing the teachings of the present invention in the form of a magnetically encodeable credit card wherein the obverse side depicted by arrow 582 thereof may contain indicia providing banker/user information or, alternatively, a standard magnetic stripe area as shown in FIGS. 19, 20, 21, 26,27, 28 and 29. The converse side thereof 584 includes a data storage device 586 located substantially centrally thereon and the data storage device has a plurality of parallel spaced magnetic tracks for storing at least five megabytes formatted of a magnetic data. The data storage device 586 covers a predetermined area of the converse side 586 so as to define a circumferential edge 588 around the periphery of the converse side 584 to provide a transition area to enable a linearly transported magnetic transducer, shown by dashed-lines 590, to be stepped onto selected magnetic tracks of the plurality of magnetic tracks for reading and/or writing of magnetic signals within the data storage device 580. A drive member depicted by box 578 is operatively coupled to the portable card as illustrated by lead line 577 and to the transducer as illustrated by lead line 579. The drive member provides the relative movement between the portable card and the transducer to position the date storage device proximate the transducer 590 to enable the interaction therebetween.

Figure 45:
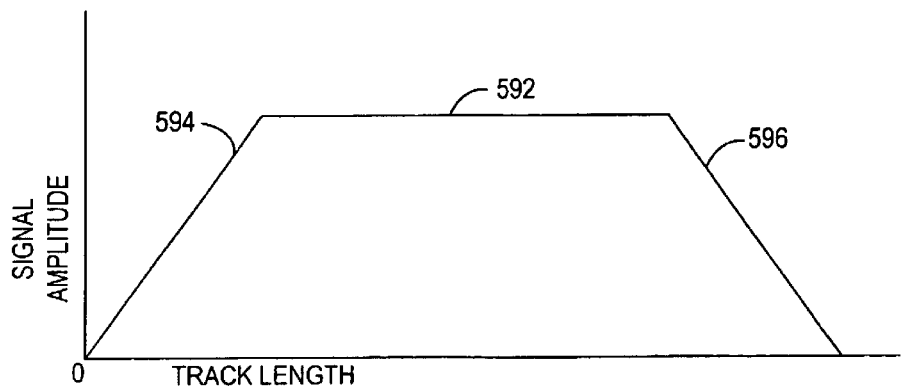
FIG. 45 is a plot depicting the magnitude of magnetic signals transduced by a magnetic transducer being transported linearly over a magnetic track plotted as a function of track length.

FIG. 45 is a plot depicting the magnitude of magnetic signals, e.g. signal amplitude, transduced by a magnetic transducer. e.g. transducer 590 in FIG. 44, being transported linearly over a magnetic track plotted as a function of track length. The resulting tracking data is depicted by line 592 and has a ramp-up portion 594 corresponding to the circumferential edge 588 around the periphery of the converse side 584 as the transducer is transported towards the data storage device 586. When the transducer interacts with the data storage device the level of the magnetic signals are at maximum amplitude at the point where the magnetic transducer passes from the circumferential edge 588 around the periphery of the converse side 584 defining a transition area located around the periphery of the converse side 584 of the portable card 580. The magnetic signals remain at maximum amplitude until the magnetic transducer passes from the data storage device 586 back onto the circumferential edge 588 around the periphery of the converse side 584 and the signal ramps down as is depicted by that potion of the line shown as 596.

Figure 46:
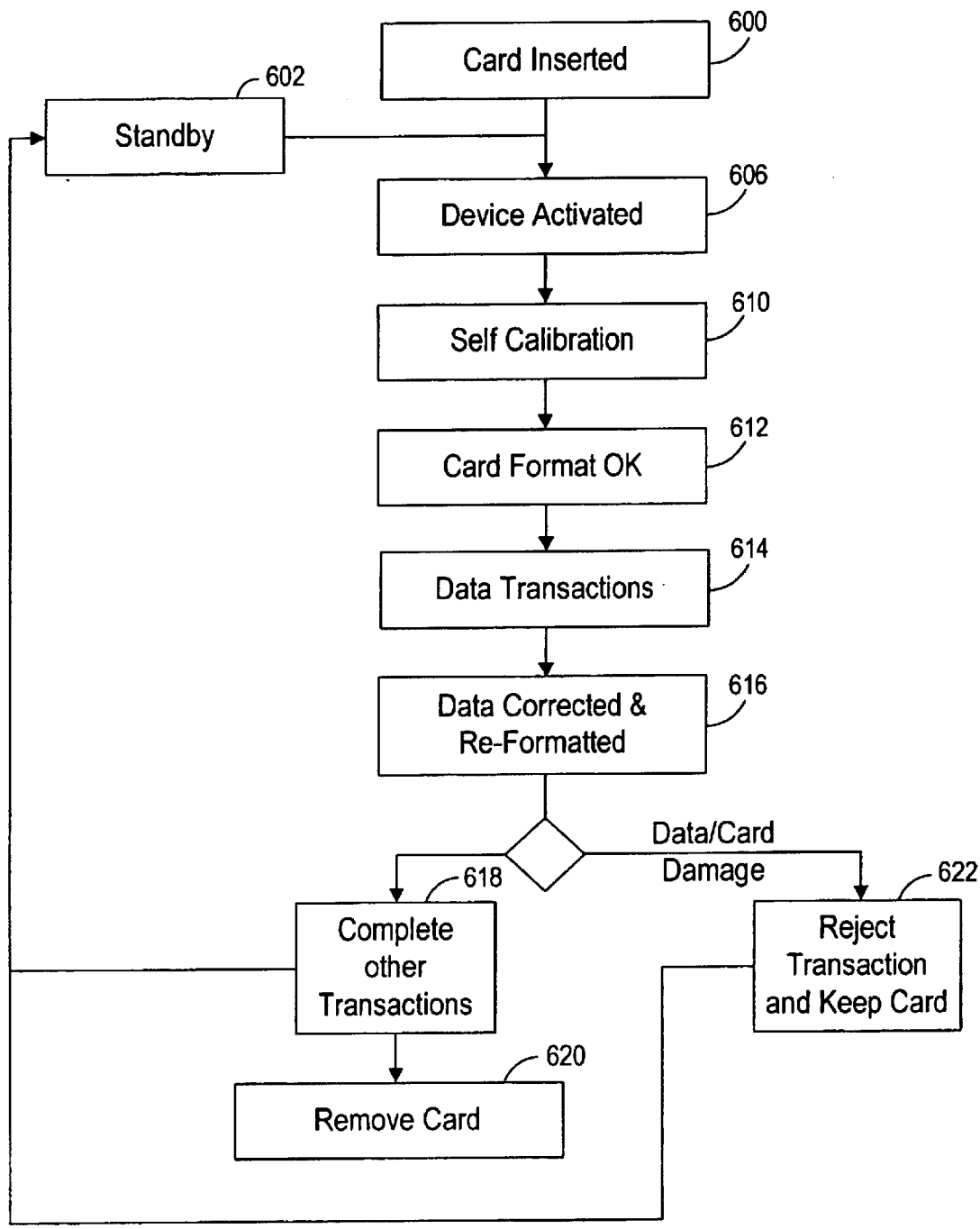
FIG. 46 is a simplified schematic diagram of a card reader for reading and reproducing information a portable card utilizing the teachings of the present invention.

The simplified schematic diagram of FIG. 46 discloses a card reader for reading and reproducing information a portable card utilizing the teachings of the present invention.

The simplified card reader schematic that illustrates that the portable card is inserted into the card reader as depicted by box 600. The card reader is programmed to be in a standby condition as depicted by box 602. When the portable card is inserted into the card reader, the card reader is activated as depicted by box 606. The card reader then performs a self-calibration step as depicted by box 610. The card reader then determines if the format of the portable card is acceptable and this step is depicted by box 612. The portable card and the data processing station located within and forming part of the card reader are moved relative to each other to cause the passage of magnetic signals between the data storage device and a transducer located within the data processing station. The relative movement between the portable card and the data processing station performs the required data transactions as depicted by box 614. To the extent that in the data corrections, recording of data, writing of data and the like, such operations are performed during such relative movement as described above and this step is depicted by box 616.

Upon completion of the data transaction 614 and data correction or other similar operations 616, a decision is made as to how the portable card is to be further processed. To the extent that any additional transactions are required before the portable card is returned to the user, the card reader completes such of the transactions as depicted by box 618. The portable card is then transported to a removable location for removal by the user and this is depicted by box 620. Upon completion of the other transactions as depicted by box 618, the card reader is placed into a standby mode in preparation for the next transaction.

If a decision is made that the data and/or card is damaged and the transaction should be rejected and/or the card is retained, that process step is depicted by box 622. Upon completion of the step depicted by box 622, the card reader is placed into a standby mode in preparation for the next transaction.

Figure 47:
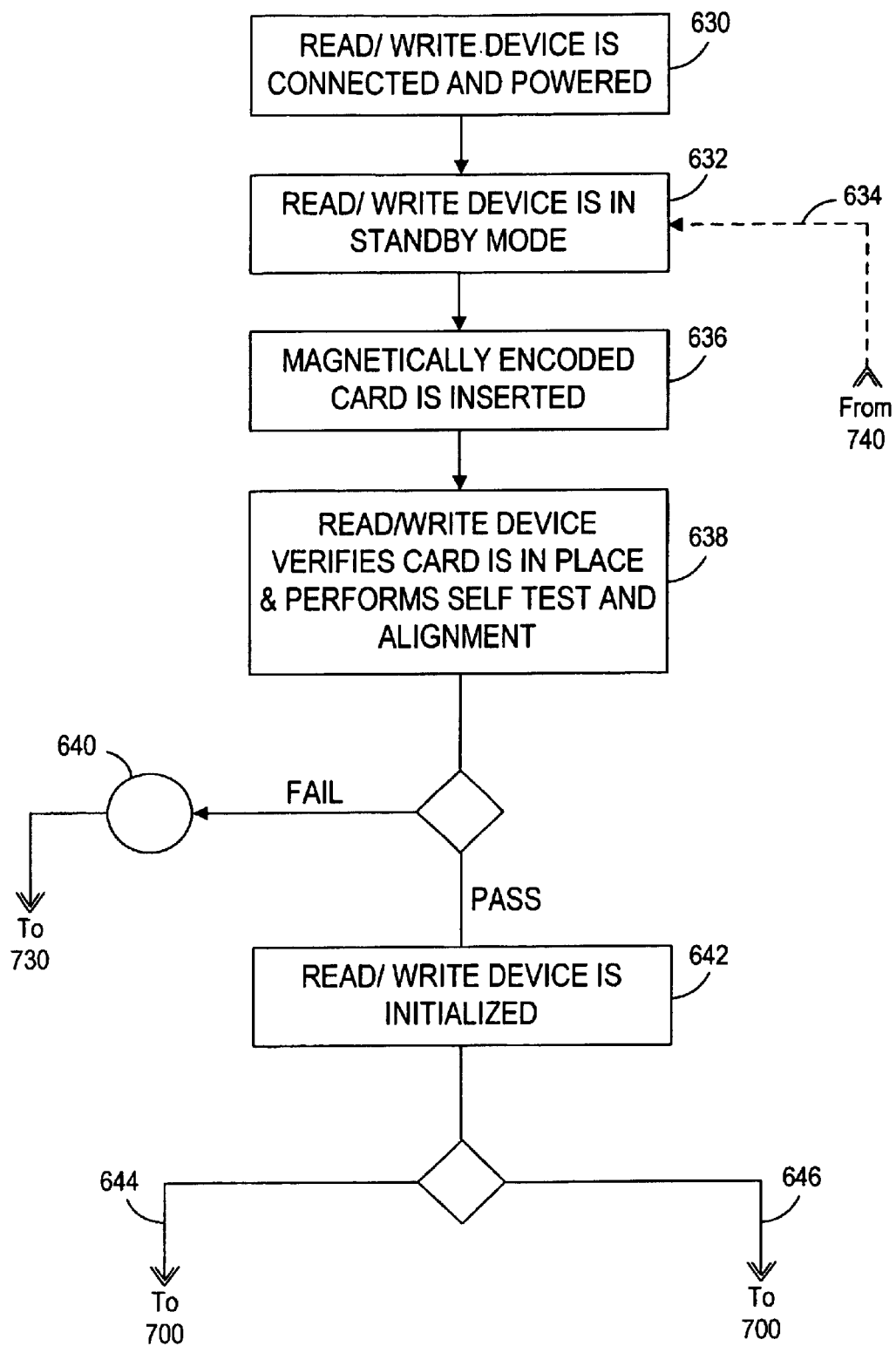
FIGS. 47 and 48, together, are a detailed schematic diagram of a card reader including data verification for reading and reproducing information from a portable credit card utilizing the teachings of the present invention.
Figure 48:
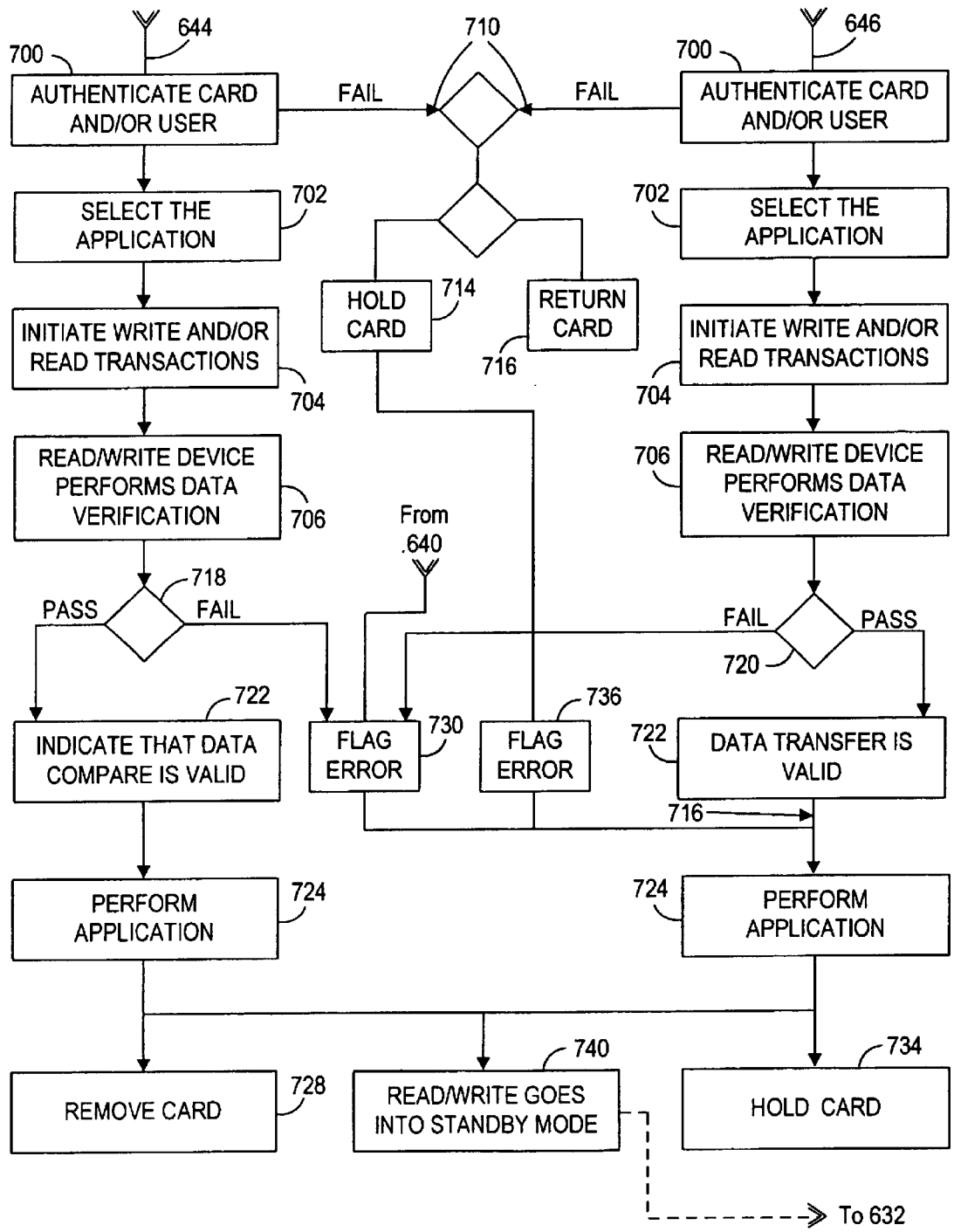

FIGS. 47 and 48, together, are a detailed schematic diagram of the operating steps or routine of a card reader for interacting with a data storage device as disclosed herein.

The description commences with FIG. 47. The card reader is a read/write device which is connected and powered from a power source and/or transmission device, and this is depicted by box 630.

The read/write device is in a standby mode until it is activated, and this is depicted by box 632. A control signal depicted by arrow 634 is typically transmitted to the card reader to designate that the card reader should change to or remain in the standby mode. A magnetically encoded card is inserted into the card reader causing the card reader to enter into its operating mode, and this is depicted by box 634.

The read/write device verifies that the card is in place and performs a self test and alignment operation, depicted by box 638. If the step of verification fails, the card is rejected, as depicted by circle 640. If the verification step is successful, then the card is deemed to have passed and the process then move into the read/write device being initialized as depicted by box 642.

The card reader then determines the operating mode as either a local mode, as depicted by lead 644, or a remote mode as depicted by lead 646.

The schematic diagram shown in FIG. 48 is referenced for the following discussion. As shown in FIG. 48, the local mode 644 and the remote mode 646 perform identical processing operations. The card reader authentic the card and/or used as depicted by box 700. The application to be performed is selected as depicted by box 702. The write and/or read transactions are initiated as depicted by box 704. The read/write performs data verification as id depicted by box 706. If a fail determination is made at the commencement of the processing, as depicted by arrows 710, then a determination is made to either hold the card, as depicted by box 714, or to return the card, as depicted by box 716.

Upon completion of the local mode or remote sequence, a determination is made that that transaction and/or data verification is valid. This is shown by rectangles 718 and 720, and the determination is pass of fail as shown in FIG. 48. If the determination is pass, then a indication is provided that the data compare is valid, as depicted by box 722, and the selected operation is performed, as depicted by box 724. Upon completion, the card is then transported to a location where the use removes the same as depicted by box 728.

If the determination is fail, then another series of determinations are enabled. The fail determination from 718 is transmitted to a flag error 730. Flag error 730 is enabled by the fail determination from 718, the fail determination from 640 and the fail determination from 720. The flag error 730 either allows the card to be returned and removed by the user, as depicted by box 728, or withhold the card as depicted by box 734.

In addition, a flag error 736 is responsive to a hold card determination 714, as described above, to withhold the card as depicted by box 734.

Upon a final determination to remove card, as depicted by box 728, or to withhold the card, as depicted by box 734, the read/write device then enabled to go into the standby mode as depicted by box 740. This determination is transmitted to the read/write device standby mode as depicted by box 632 n FIG. 47 by lead 634.

In the standby mode, the card reader is again actuated by the insertion of a portable card in the form of a magnetically encoded card as depicted by box 636 as described hereinbefore. Upon insertion of the portable card, the processing then commences as described herein.

The processing steps described herein in FIGS. 47 and 48 for the card reader is the preferred embodiment. It is envisioned that certain of the process steps can be eliminates or modified or that other process steps can be added, all of which are within the teachings of the present invention.

As discussed hereinbefore, it is anticipated that the protective coating could be subject to the collection of debris, finger prints or the like from normal handling by a user in an ambient and normal environment, as differentiated form a protected environment required for hard disk drive devices.

Therefore, the accuracy and reliability of reproducing (reading) encoded data from the portable card by a card reading apparatus and/or by methods for processing the portable card can be improved or enhanced by use of a card cleaner and process for cleaning a portable card prior to the card reader processing the portable card.

Figure 49:
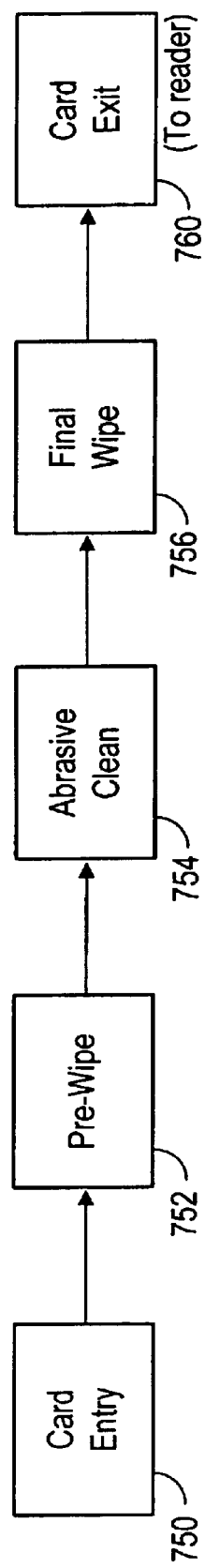
FIG. 49 is a simplified schematic diagram of a card cleaner for cleaning debris, fingerprints and the like from a portable card utilizing the teachings of the present invention wherein the cleaning process is preformed prior to processing by a card reader for reading and reproducing information from the portable card.

FIG. 49 is a simplified schematic diagram of a card cleaner for cleaning debris, fingerprints and the like from a portable card utilizing the teachings of the present invention. the cleaning process is commenced when a card is inserted into the card reader is depicted by box 750. Upon insertion of the card, the card is prewiped as depicted by box 752.

Thereafter, a mild, but effective, abrasive cleaning processing procedure is performed on the portable card to effectively remove debris, fingerprints and the like therefrom as depicted by box 754. A final wipe procedure is performed as depicted by box 756. The cleaned and wiped portable card is then exited as depicted by box 760. The portable card is then transported directly to the input section of the card reader as an inserted card as shown by box 636 in FIG. 47. The schematic diagram of FIG. 49 is the preferred embodiment of a cleaning process that is preformed prior to processing by a card reader for reading and reproducing information from the portable card, but all variations thereof are envisioned to be with the teachings of the present invention.

Figure 50:
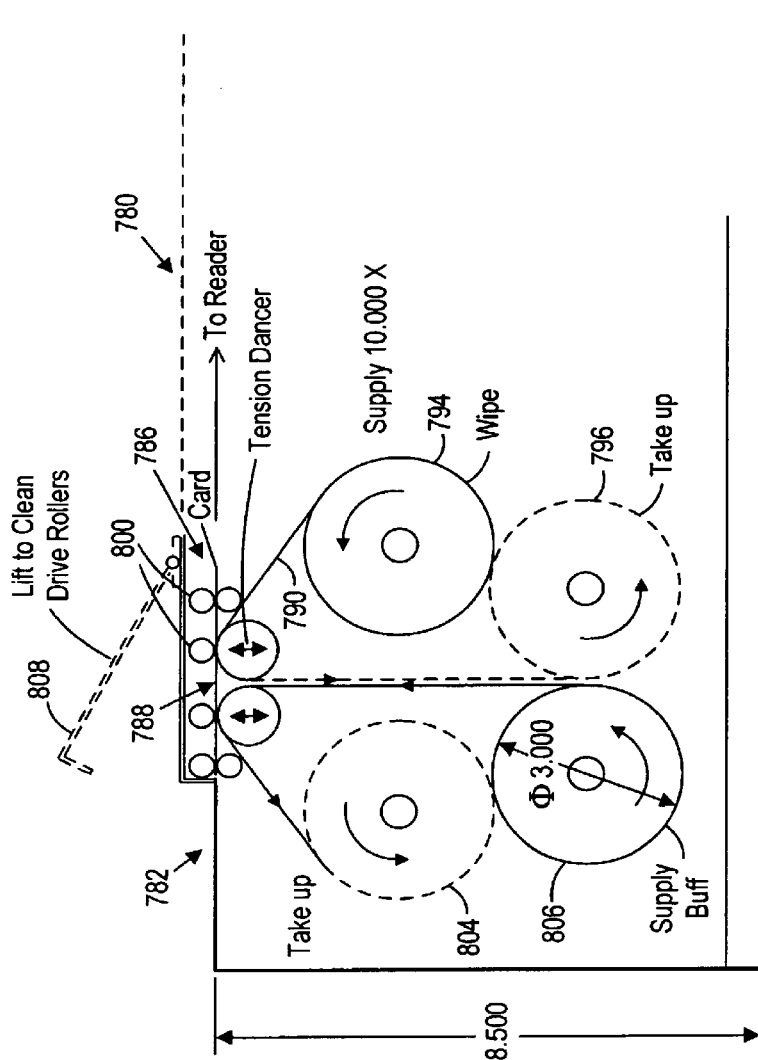
FIG. 50 is a pictorial representation of a front elevational view of a card cleaner having a card feeder for carrying out the card cleaning process.
Figure 51:
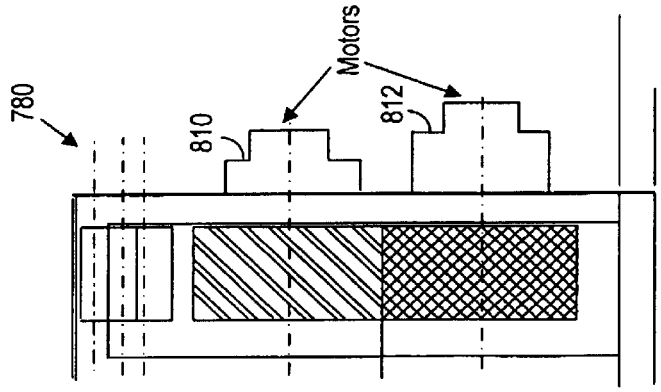
FIG. 51 is a pictorial representation of a left side elevational view of a card cleaner illustrated in FIG. 50.

FIGS. 50 and 51 disclose one embodiment of a card cleaner 780 having a card feeder 782 for transporting a card 786 past an abrasive cleaning station 788 for carrying out carrying out the card cleaning process. In FIG. 50, the abrasive apparatus utilizes a strip abrasive material 790 which is supplied from supply reel 794, driven by drive member 796. The strip abrasive material 790 is brought into cleaning engagement with the card 786 by rollers 800 to mildly wipe and abrade the card protective coating as described herein, The expended or used strip abrasive material is past over a drive member 804 and onto a take up reel 806. A cover 808 located proximate the rollers 800 can be lifted to clean the roller 800.

FIG. 51 illustrate that drive motors 810 and 812 are used to drive the supply reel 794 and the take up reel 806, respectively.

Figure 52:
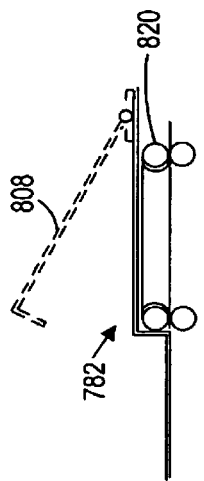
FIG. 52 is a pictorial representation of an alternate structure of a card feeder for use with the card cleaner illustrate in FIG. 50.

FIG. 52 is a pictorial representation of an alternate structure of a card feeder and cleaner for rollers 800 illustrated in FIG. 50. In FIG. 52, the card feeder 782 includes an endless belt 820 to replace the roller 800 in FIG. 50. The cover 808 located proximate the endless belt 808 can be lifted to clean the endless belt 808.

Figures 53, 54:
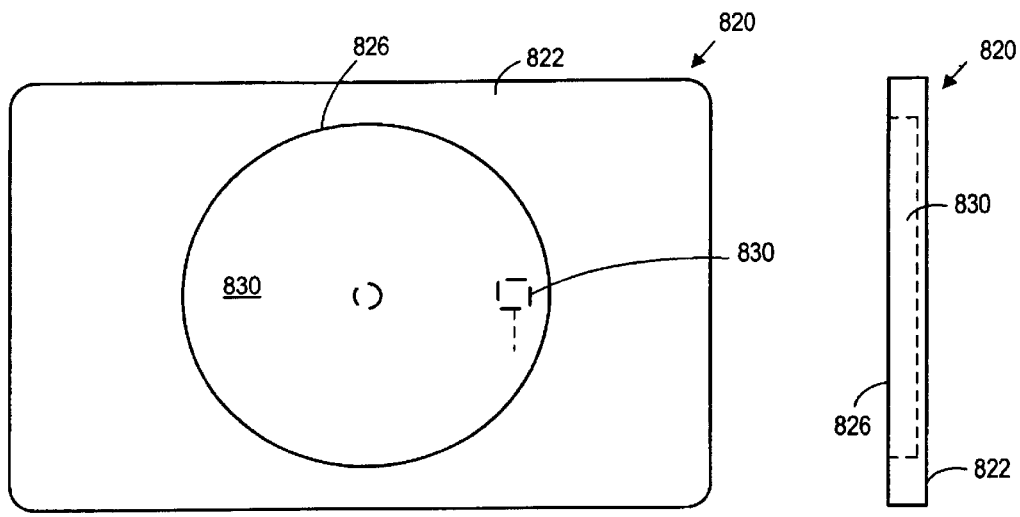
FIG. 53 is a pictorial representation of still yet another embodiment of a portable card utilizing the teachings of the present invention wherein a substrates enclosed the data storage device is in the form of a disk rigidly affixed to the substrate and wherein the entire substrate including the disk is rotated relative to a magnetic transducer shown by dashed lines.
FIG. 54 is a right end elevational view of the portable card of FIG. 53 showing the disk fixedly located within the substrate by dashed lines.

In FIGS. 53 and 54, a portable card 820 includes a substrate 822 to enclosed a data storage device 826 in the form of a disk 830 rigidly affixed to the substrate 822. In this embodiment, the entire portable card 820 including the substrate and disk 830 is rotated relative to a magnetic transducer shown by dashed lines 830 to pass magnetic signals therebetween. In the preferred embodiment, the data storage device 826 is formed utilizing the teaching of the present invention.

Figures 55, 56:
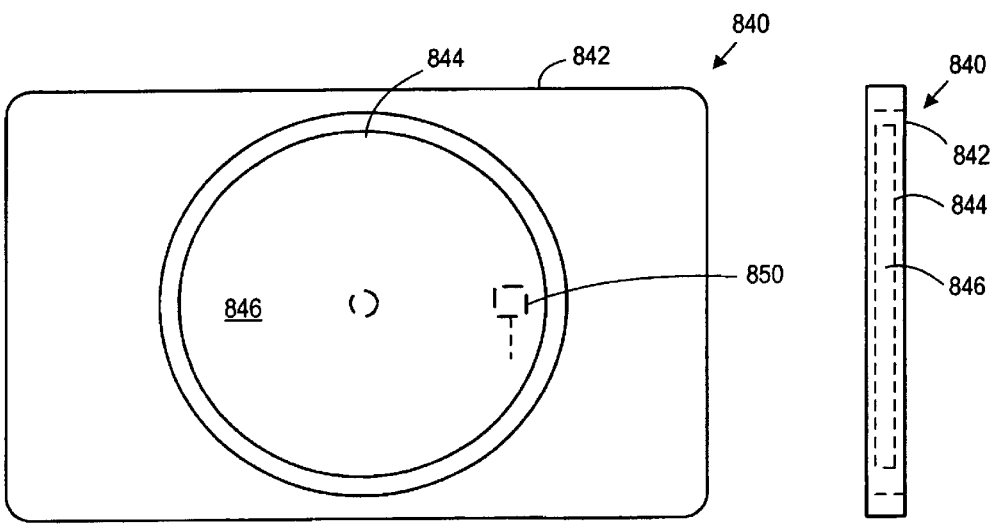
FIG. 55 is a pictorial representation of still yet another embodiment of a portable card utilizing the teachings of the present invention wherein a substrate encloses a data storage device in the form of a disk rotatably mounted to or supported with the substrate and wherein the disk is rotated within the substrate relative to a magnetic transducer shown by dashed lines.
FIG. 56 is a right end elevational view of the portable card of FIG. 55 showing the disk rotatably located within the substrate by dashed lines.

FIGS. 55 and 56 are pictorial representations of still yet another embodiment of a portable card 840 utilizing the teachings of the present invention. A substrate 842 enclosed a data storage device 844 in the form of a disk 846 rotatably mounted within or supported within the substrate 842. The disk 846 is rotated within the substrate 842 relative to a magnetic transducer shown by dashed lines 850.

Based on the above disclosures a card and card reader system is disclosed. The card and card reader comprises an encodeable card comprising a body having upper and lower surfaces and side and end edges and wherein the body includes on at least one of the upper and lower surfaces a data storage section adapted to interact with a data processing station when the card and the data processing station are moved relative to each other to at least one of encode signals in the data storage section and read encoded signals from the data storage section. The data storage section includes at least one thin film layer of high density storage material for storing data and a protective coating formed on the thin film layer which is selected to have a thickness to facilitate passage of encoded and encoding signals in an ambient natural atmospheric operating environment through the protective coating and the thin film layer and the protective coating formed of a material which resists at least one of chemical, magnetic and mechanical degradation of the data storage device.

The card reader has a transducer for at least one of encoding signals in the data storage section and reading encoded signals from the data storage section during relative movement of the card relative to the data processing station to enable data flow between the data storage section and the transducer.

In the preferred embodiment, the encodeable card is a magnetically encodeable card and the data storage section has at least one thin film layer of high density, high coercivity magnetic material having a predetermined magnetic field orientation for storing data. The transducer may be a thin film head, a magnetoresistive head or a giant magnetoresistive (GMR) head.

The encodeable card may optionally be an optically encodeable card and wherein the data storage section has at least one thin film layer of high density, optical recording material which is capable of reading and storing data in optical form. The transducer may be a laser adapted to reading and record optical data on said optical recording material.

It is envisioned that the card and card reader system may comprise, in the preferred embodiment, a magnetically encodeable card comprising a body having upper and lower surfaces and side and end edges wherein the body includes on at least one of the upper and lower surfaces a data storage section adapted to interact with a data processing station when the card and the data processing station are moved relative to each other. The data storage member may include at least one thin film layer of high density, high coercivity magnetic material having a predetermined magnetic field orientation for storing data.

A protective coating is formed on the at least one thin film layer of high density, high coercivity magnetic material and is selected to have a thickness to facilitate passage of magnetic signals in an ambient natural atmospheric operating environment through the protective coating and the thin film layer. The protective coating may be formed of a material which resists at least one of chemical, magnetic and mechanical degradation of the data storage device. The protective coating is adapted to interface with and be responsive to a data processing station when the substrate and data processing stations are moved relative to each other to enable data flow therebetween. The reader has a transducer for reading the magnetically encoded storage section during relative movement of the card relative to the data processing station to enable data flow between the data storage section and the transducer. The transducer is capable of at least one of encoding magnetic signals in said data storage section and reading encoded magnetic signals from said data storage section during relative movement of the card relative to the data processing station to enable data flow between the data storage section and the transducer.

The at least one thin film layer of high density, high coercivity magnetic material may be a sputtered layer or a platted layer. The transducer may be a thin film magnetic head, a magnetoresistive head or a giant magnetoresistive (GMR) head. The magnetoresistive head may include a dual stripe magnetoresistive element. In addition the magnetoresistive head may include a magnetic flux guide for conducting magnetic flux from the data storage section of the card read by said reader to the magnetoresistive head.

The data storage section may include data tracks having a predetermined width formed on a selected surface of the card and the predetermined width may be wider than said magnetoresistive head or have a predetermined width in the range of about "1" times to about "2" times wider than the magnetoresistive head.

A method for reading a card with a card reader is disclosed. The method comprises the steps of (a) forming on a substrate of a card a data storage section adapted to interact with a data processing station when the card and the data processing station are moved relative to each other to at least one of encode signals in the data storage section and read encoded signals from the data storage section; (b) forming a relatively hard, abradeable protective coating on said data storage section having a thickness between a maximum thickness which would materially attenuate encoding and encoded signals passing between said data storage section and a transducer and a minimum thickness enabling said protective coating to be abraded by usage in an ambient natural atmosphere operating environment for removing therefrom a known quantity of the protective coating; and (c) moving the card and data processing station relative to each other to interface the data storage section relative to a transducer to enable data flow therebetween.

The step of forming may include forming a data storage section having at least one thin film layer of high density, high coercivity magnetic material having a predetermined magnetic field orientation for storing data.

The step of moving may include using a transducer which is a thin film head, a magnetoresistive head or a giant magnetoresistive (GMR) head.

The step of forming may include forming a data storage section having at least one thin film layer of high density, optical recording material which is capable of reading and storing data in optical form. The step of moving may include using a transducer which is a laser adapted to reading and record optical data on the optical recording material. In the preferred embodiment, a method for reading a card with a card reader may comprise the steps of: (a) forming on a substrate of a card a data storage section including a thin film of magnetic material having a predetermined magnetic orientation for storing data in a predetermined axis; (b) providing a protective coating including a magnetically permeable, magnetically saturable material which is disposed on an exchange break layer and responsive through the exchange break layer to the coercive material axes of magnetization to produce a magnetic image field in a direction opposite to the predetermined direction, the protection coating being formed of a material which resists at least one of chemical, magnetic and controllable mechanical degradation of the magnetic recording medium; and (c) moving the card and data processing station relative to each other to interface the data storage section relative to a transducer to enable data flow therebetween.

Also disclosed is a data storage device comprising a substrate having at least one surface. At least one high density magnetically coercive material layer is disposed on the substrate for storing magnetic signals with the coercive material axis of magnetization oriented in a predetermined direction relative to the at least one surface of the substrate. At least one non-magnetic material layer is disposed on the substrate for defining an exchange break layer. A protective coating is formed on the substrate and is selected to have a depth in a direction substantially normal to said exchange break layer to facilitate passage of magnetic signals in an ambient natural atmospheric operating environment through the exchange break layer and the coercive material having the axis of magnetization in the predetermined direction. The protective layer is formed of a material which resists at least one of chemical, magnetic and mechanical degradation of the data storage device. The substrate is preferably a non-magnetic substrate and the protective coating includes a magnetically permeable, magnetically saturable storage material disposed on the substrate and which is responsive through the exchange break layer to the coercive material axis of magnetization in the predetermined direction to produce a magnetic image field in a direction opposite to the predetermined direction.

The protective coating may include the magnetically permeable, magnetically saturable storage material as a separate independent layer disposed on the exchange break layer. Optionally, the protective coating may include a non-magnetic abrasion resisting layer as a separate independent layer disposed on the magnetically permeable, magnetically saturable storage material layer.

The at least one high density magnetically coercive material layer is disposed on the substrate for storing magnetic signals with the coercive material axis of magnetization oriented in a predetermined direction relative to the at least one surface of the substrate, and the predetermined direction may be: (i) orientated substantially parallel to said at least one surface of said substrate; (ii) orientated at an acute angle to said at least one surface of the substrate; (iii) orientated substantially perpendicular to the at least one surface of the substrate.

Also disclosed herein is a magnetically encodeable card comprising a non-magnetic substrate having at least one surface having a thin film, high density magnetically coercive material disposed on the substrate for storing magnetic signals with the coercive material axis of magnetization oriented in a predetermined direction relative to the at least on surface of said substrate. A non magnetic material is disposed on the substrate for defining an exchange break layer.

A protective coating is formed on the substrate in a direction substantially normal to the exchange break layer and the protective coating includes a magnetically permeable, magnetically saturable storage material disposed on the substrate and which is responsive through the exchange break layer and the magnetically saturable storage material to the coercive material axis of magnetization to produce a magnetic image field in a direction to facilitate passage of magnetic signals in an ambient natural atmospheric operating environment through the exchange break layer and the magnetically saturable storage material. The protective coating is formed of a material which resists at least one of chemical, magnetic and mechanical degradation of the data storage device.

Alternatively, the protective coating may include the magnetically permeable, magnetically saturable storage material being an independent layer disposed on the substrate. In addition, the protective coating may include a non-magnetic abrasion resisting material as a separate layer disposed on the magnetically permeable, magnetically saturable storage material.

In the magnetically encodeable card, the at least one high density magnetically coercive material layer is disposed on the substrate for storing magnetic signals with the coercive material axis of magnetization oriented in a predetermined direction relative to the at least one surface of the substrate, and the predetermined direction may be: (i) orientated substantially parallel to said at least one surface of said substrate; (ii) orientated at an acute angle to said at least one surface of the substrate; (iii) orientated substantially perpendicular to the at least one surface of the substrate.

The magnetically coercive material has a coercivity, in the preferred embodiment, of at least 1,000 oersteds and the magnetically permeable, magnetically saturable storage material has a coercivity of less than about 100 Oersteds. A magnetic signal processing apparatus is disclosed comprising a magnetic recording medium having a high density magnetically coercive material for storing magnetic signals with the coercive material axes of magnetization oriented in a predetermined direction; a non-magnetic material disposed on the high density magnetically coercive material for defining a exchange break layer and a protective coating which includes a magnetically permeable, magnetically saturable material which is disposed on the exchange break layer and which is responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium.

The apparatus includes a magnetic transducer positioned relative to a surface of the recording medium for transferring signals with respect to the recording medium. A drive member is operatively coupled to at least one of the transducer and the recording medium to provide relative movement therebetween. A magnetic control device having a bias field adapted to increase, through the protective coating and the exchange break layer, the reluctance of the magnetic saturable, magnetically permeable material to enable a magnetic signal to pass between the high density magnetically coercive material through the exchange break layer and the protective coating to the magnetic transducer.

A method of processing magnetic signals using a magnetic recording medium having a high density magnetically coercive material for storing magnetic signals with the coercive material axes of magnetization oriented in a predetermined direction is disclosed. The method comprises the steps of: (a) providing a layer of a non-magnetic material disposed on said high density magnetically coercive material for defining a exchange break layer; (b) providing a protective coating including a magnetically permeable, magnetically saturable material which is disposed on the exchange break layer and responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium; and (c) generating with a magnetic control device having a bias field adapted to increase through the protective coating and the exchange break layer the reluctance of the magnetic saturable, magnetically permeable material to enable the magnetic signal to pass between the high density magnetically coercive material through the exchange break layer and the protective coating to a magnetic transducer.

A system is disclosed which comprises a magnetic recording medium having a high density magnetically coercive material for storing magnetic signals with the coercive material axes of magnetization oriented in a predetermined direction. A non-magnetic material is disposed on the high density magnetically coercive material for defining a exchange break layer. A protective coating including a magnetically permeable, magnetically saturable material disposed on the exchange break layer and which is responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium.

A magnetic transducer is positioned relative to a surface of the recording medium for transferring signals with respect to the recording medium. A drive member is operatively coupled to at least one of the transducer and the recording medium to provide relative movement therebetween.

A magnetic control device having a bias field adapted to increase through the protective coating and the exchange break layer the reluctance of the magnetic saturable, magnetically permeable material to enable the magnetic signal to pass between the high density magnetically coercive material through the exchange break layer and the protective coating to the magnetic transducer.

A programmable control device operatively connected to the magnetic control device is used to cause the bias field to be applied to the recording medium when a selected magnetic image is located substantially adjacent the transducer.

The protective coating may have at least one layer which includes a magnetically permeable, magnetically saturable storage material. Alternatively, the protective coating may have at least two layers wherein one of the layers includes a magnetically permeable, magnetically saturable storage material and the other of the layers is a non-magnetic abrasion resisting layer formed on the one of the layers.

The data storage device may further include a non-magnetic material layer positioned between the protective coating and the at least one thin film layer. The magnetically permeable, magnetically saturable storage material is responsive through the non-magnetic layer to the coercive material axis of magnetization in the predetermine direction to produce a magnetic image field in a direction opposite to the predetermined direction.

Alternatively, the protective coating may have at least two layers wherein one of the layers includes a magnetically permeable, magnetically saturable storage material and the other of the layers is a non-magnetic abrasion resisting layer formed on the one of the layers In such a device, the data storage device may further includes a non-magnetic material layer positioned between the one of the layers of the protective coating and the at least one thin film layer and wherein the magnetically permeable, magnetically saturable storage material is responsive through the non-magnetic layer to the coercive material axis of magnetization in the predetermine direction to produce a magnetic image field in a direction opposite to the predetermined direction.

Figure 57:
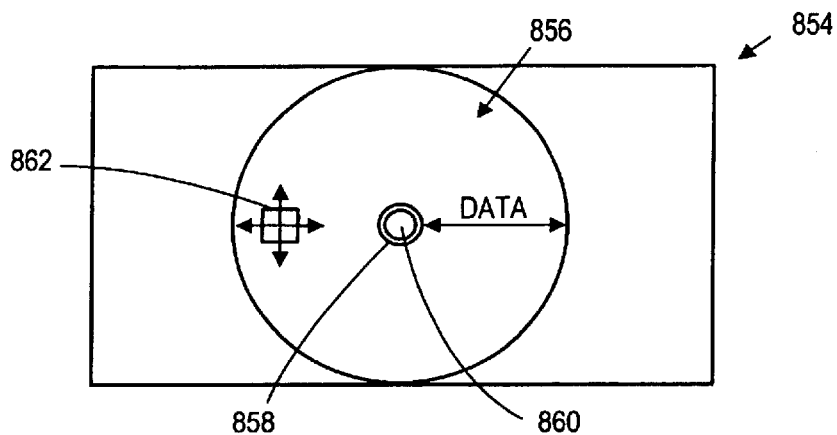
FIG. 57 is a pictorial representation of an encodeable card having a data storage device which is circular-shaped and is formed of a recording medium wherein the recording medium facilitates passage of encoding signals between a transducer shown in dashed lines and the recording medium, and wherein the recording medium includes a protective coating which resists at least one of chemical, magnetic and mechanical degradation of the data storage device.

In FIG. 57, the pictorial representation of an encodeable card 854 has a data storage device 856 which is circular-shaped and is formed of a recording medium wherein the recording medium facilitates passage of encoding signals between a transducer shown in dashed lines and the recording medium. The recording medium includes a protective coating which resists at least one of chemical, magnetic and mechanical degradation of the data storage device. The encodeable card 854 can be a magnetically encodeable card, an optically encodeable card or a magneto-optical encodeable card. The encodeable card may include an aperture 858 for receiving a spindle 860 of a drive member to rotate the card relative to t transducer 862. Of course, the encodeable card could be fixed and the transducer moved relative to the card or both the card and transducer may be moved relative to each other.

Figure 58A:
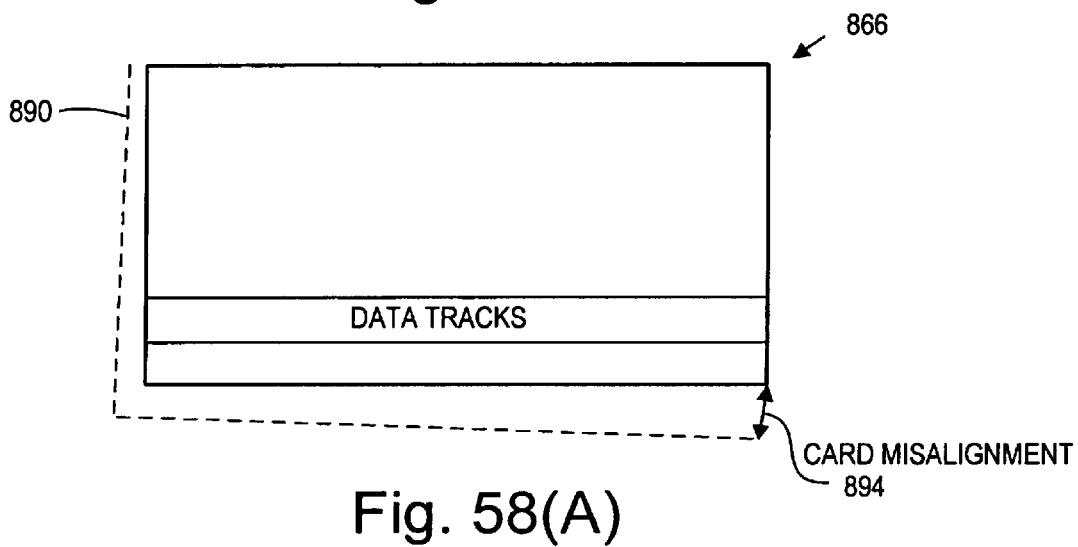
FIG. 58(A) is a pictorial illustration of a portable card of the present invention wherein the card upon insertion is misaligned relative to the transducer.

FIG. 58(A) is a pictorial illustration of a portable card 866 of the present invention having data tracks wherein the card 866 upon insertion is misaligned relative to a data processing station shown by dashed lines 890. The misalignment is depicted by arrow 894.

Figure 58B:
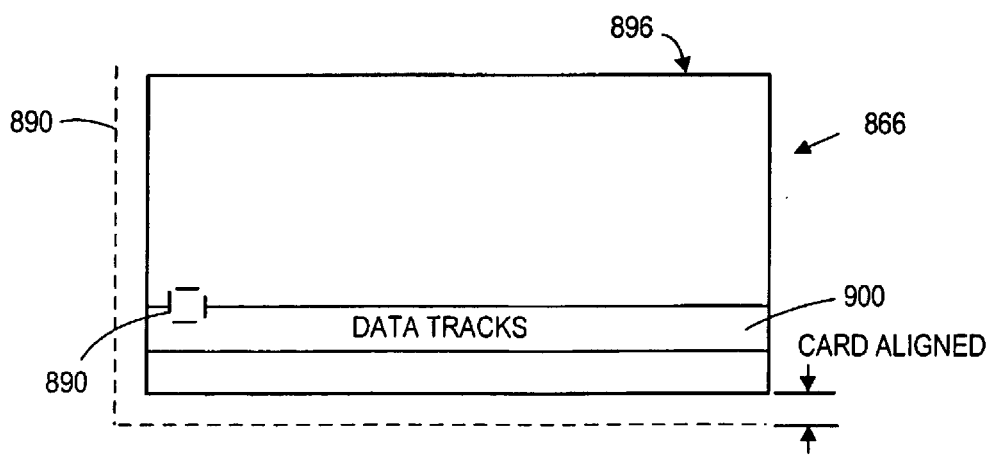
FIG. 58(B) is a pictorial representation of an alignment mechanism adjust the portable card in a direction to bring the same into alignment to enable a transducer to interact with a data storage device in the form of high density data tracks.

FIG. 58(B) is a pictorial representation of an alignment mechanism 896 for adjusting the portable card in a clockwise direction to bring the same into alignment with a data processing station and proximate a transducer 898 which is capable of interacting with an aligned data storage device in the form of high density data tracks 900.

Figure 59A:
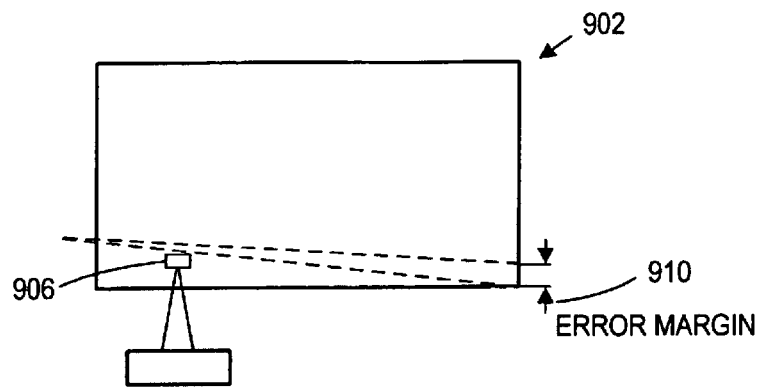
FIG. 59(A) is a pictorial illustration of a portable card wherein the entire card comprises a magnetic data storage device using the teachings of the present invention wherein the card upon insertion is misaligned relative to the transducer.

FIG. 59(A) is a pictorial illustration of another portable card wherein the entire card 902 may comprise a magnetic data storage device shown by arrow 904 using the teachings of the present invention wherein the card upon insertion is misaligned relative to the transducer 906 with the magnitude of the alignment being depicted be arrow 910.

Figure 59B:
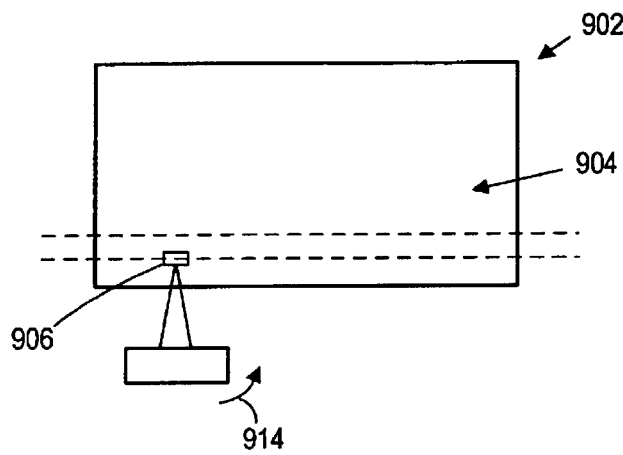
FIG. 59(B) is a pictorial representation of an alignment mechanism adjust the a transducer in a direction to bring the same into alignment to with the misaligned portable card to enable a transducer to interact with a data storage device in the form of high density data tracks.

FIG. 59(B) is a pictorial representation of an alignment mechanism 914 to compensate for the misaligned portable card 902 of FIG. 59(A) by adjusting the transducer 906 in a direction to bring the same into alignment with the misaligned portable card to enable the transducer 906 to interact with a data storage device 904 in the form of high density data tracks.

Figure 60:
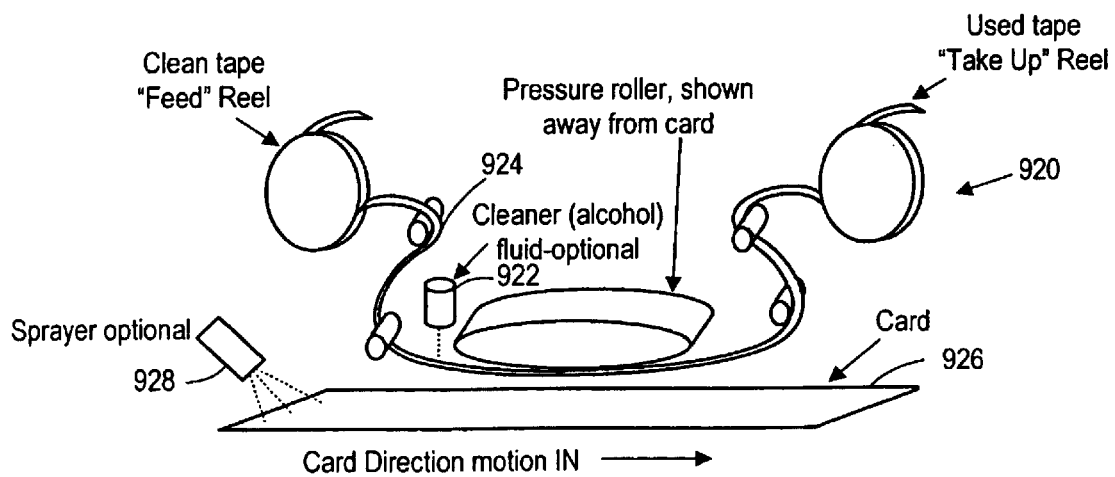
FIG. 60 is a pictorial representation of another embodiment of a card cleaner utilizing a fluid cleaner in association with a card cleaning strip member and, optionally, a spray coating device for forming a fluid film on the card for interaction with a cleaning strip member.

FIG. 60 is a pictorial representation of another embodiment of a card cleaner 920 utilizing a fluid cleaner 922 in association with a card cleaning strip member 924 for cleaning a portable card 926. Optionally, a spray coating device 926 for forming a fluid film on the card 926 is shown. the spray coating device applies a fluid coating to the card 926 for interaction with the cleaning strip member 924.

Figure 61:
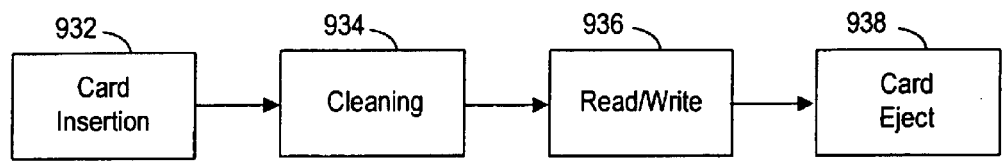
FIG. 61 is a simplified block diagram of a card cleaner having a verification procedure in the form of a read/write sequence to insure that cleaned portable card is capable of being processed and read by a card reader.

FIG. 61 is a simplified block diagram of a card cleaner having a verification procedure in the form of a read/write sequence to insure that cleaned portable card is capable of being processed and read by a card reader. The card is inserted as depicted by box 932, the card is cleaned as depicted by box 934, a read/write verification procedure is performed as depicted by box 936. If the card cannot be pass the read/write sequence, it is rejected as depicted by box 938.

Figure 62:
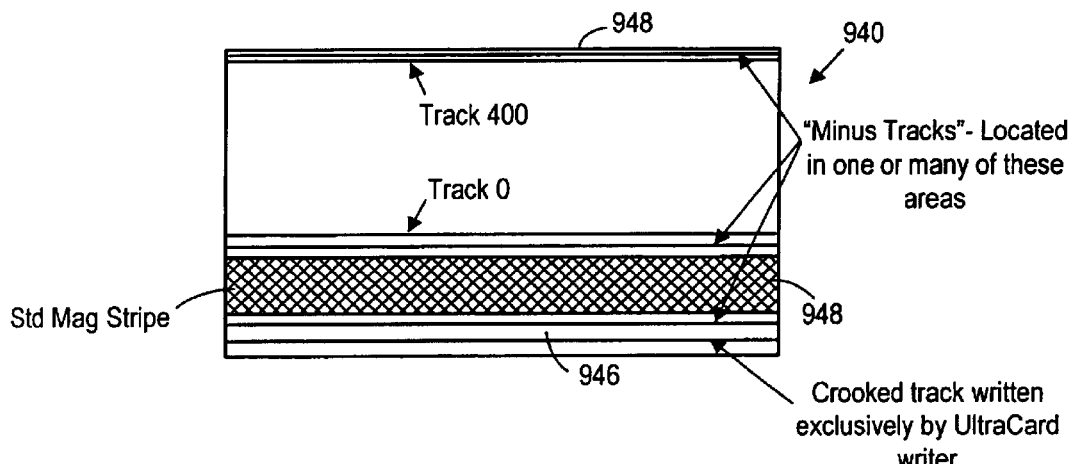
FIG. 62 is a pictorial representation of a portable card having a standard magnetic stripe area wherein a recording medium utilizing the teachings of the present invention and having one or more a high density magnetic tracks are superimposed onto the portable card adjacent a standard magnetic stripe to provide additional encoded data to a card reader and which is capable of being encoded by a card reader.

FIG. 62 is a pictorial representation of a portable card 940 having a standard magnetic stripe area 948 wherein a recording medium. One or more a high density magnetic tracks 946 and 948 are superimposed onto the portable card at least one of which is adjacent to the standard magnetic stripe area 948 to provide additional encoded data to a card reader. The high density magnetic tracks 946 and 948 are capable of being read and/or encoded by a card reader.

Figure 63:
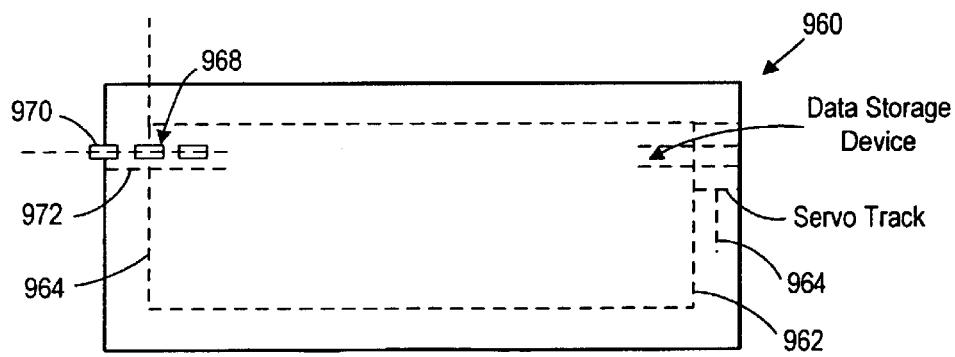
FIG. 63 is a pictorial representation of a portable card having a data storage device formed thereon utilizing the etchings of the present invention wherein the circumferential edge extending around the periphery of the data storage device is a member capable of providing servo tracks which can be read by a servo transducer to prealign a read/write transducer with the data track located on the data storage device prior to the read/write tracks transducer passing from the transition area defined by the circumferential edge onto the recording medium forming the data storage medium.

FIG. 63 is a pictorial representation of a portable card 960 having a data storage device formed thereon utilizing the etchings of the present invention wherein the circumferential edge 964 extending around the periphery of the data storage device each end of the lineal data track is a member capable of providing servo tracks which can be read by a servo transducer to prealign a read/write transducer 970 with the data track 972 located on the data storage device prior to the read/write tracks transducer 970 passing from the transition area defined by the circumferential edge 964 onto the recording medium forming the data storage device 962.

Figure 64:
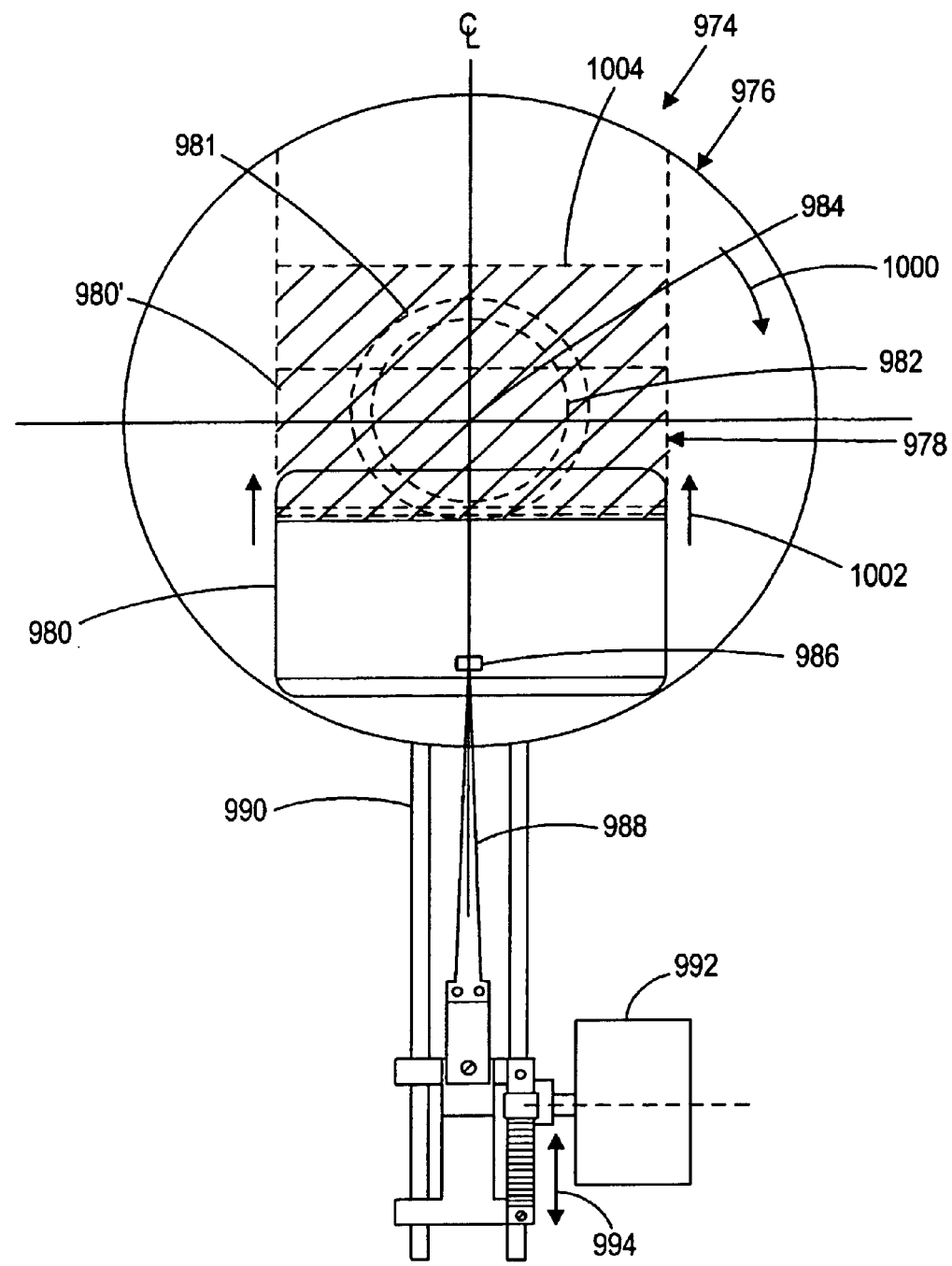
FIG. 64 is a top plan view of an embodiment of a rotational high-memory portable card and card reader wherein the portable card is rotated about its center axis by a disk drive in a normal ambient operating environment.
Figure 65:
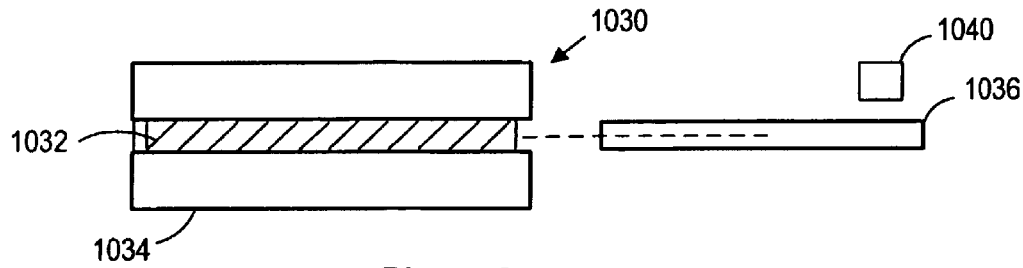
FIG. 65 is a front plan view of yet another embodiment of a linear high-memory portable card wherein the portable card is withdrawn from a protective holder into a read/write position.
Figure 66A:
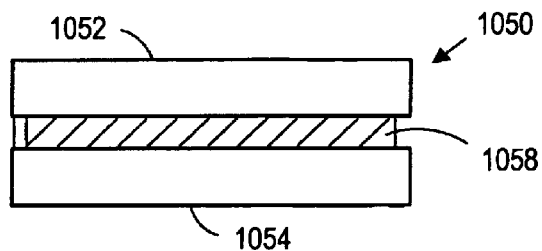
FIG. 66(A) is a front plan view of still yet another embodiment of a high-memory portable card wherein the portable card is stored within a protective hinged housing and the hinged housing is in a closed position.
Figure 66B:
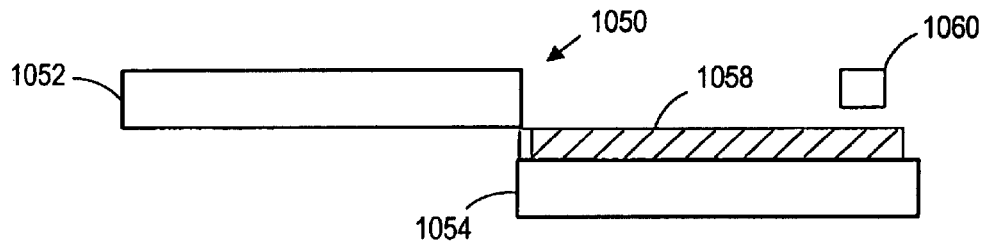
FIG. 66(B) is a front plan view of the embodiment illustrated in FIG. 66(A) wherein the hinged housing has been moved to an open position exposing the card to a read/write position.

FIG. 64 is a top plan view of an embodiment of a rotational portable card having a data storage region and card reader wherein a portable card is rotated about its center axis by a disk drive in a rotating disk operating environment.

The preferred embodiment of the rotational portable card apparatus of the present invention is broadly denoted by the numeral 974 and is illustrated schematically in FIG. 64. Apparatus 974 includes a disk-shaped support member 976 having a central opening shown by arrow 978 in its upper surface providing a space to receive and hold a portable card shown by dashed lines 980'. The portable card 980' may have at least one surface comprised in its entirety of a magnetizable medium as illustrated in FIGS. 30 and 32, or alternatively have inserted thereon or placed thereon in the form of a strip of magnetizable medium, as illustrated on FIGS. 33 through 36, and on which data can be magnetically recorded. Further, the portable card may comprise the structure illustrated in any one or FIGS. 26, 28 and 57. For example, the data storage section of the portable card 980', could be circular shaped as shown by dashed circle 981. The portable card shown as 9801 is advanced into rotational position as illustrated by portable card 980'. The disk shaped support member 976 has a spindle motor, such as a standard disk drive motor shown by the dashed circle 982 below the disk shaped support member 976, for rotating the disk shaped support member 976 and portable card 980' in a circumferential direction and around its central axis 984. The direction of rotation is indicated by arrow 1000. Thus, the disk shaped support member 976 rotates the portable card 980' relative to a read/write transducer or head 986 mounted on the outer end of an arm 988. Arm 988 is coupled to a head actuating mechanism 990 driven by stepper motor 992 for moving the head back and forth as indicated by arrows 994 when the head actuating mechanism 990 receives control signals from a control means (not shown) and coupled to the stepper motor 992. To load the transducer 986 onto the rotating portable card 980'. The stepper motor 992, through arm 988, enables the read/write head to move radially into transducing position relative to the portable card 980' in response to the head actuating mechanism 990 being actuated by the stepper motor 992. The read/write transducer a head 986 may include a first and second transducer used as a read head and write head. The head may be an inductive transducer or thin filmed transducer.

The disk drive apparatus is provided with a slot through which it can pass the portable card 980. The portable card 980 is moved longitudinally by an activating member designated by arrow 1002 until the leading edge 1004 of the portable card 980' is located or positioned on the disk shaped support member 976 enabling the portable card 9801 to be rotated thereby enabling a transducing action between the magnetic medium of the portable card 980 and the transducing head 986. The layer of magnetic material may have a predetermined field of orientations for storing magnetic signal.

Figure 67:
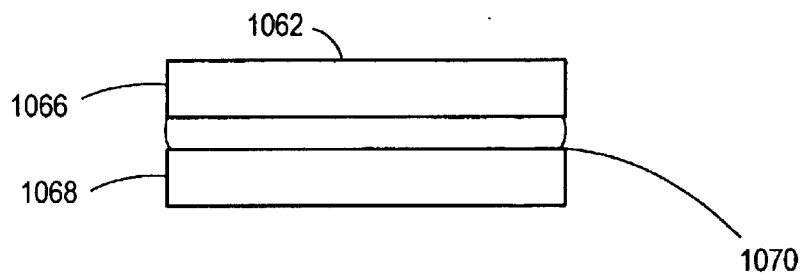
FIG. 67 is a front plan view of still yet another embodiment of a linear or rotational high-memory portable card wherein the portable card is maintained in a protective housing having a removable top section and removable bottom section which can be separated to bring the card from the protective holder into a read/write position.
Figure 68:
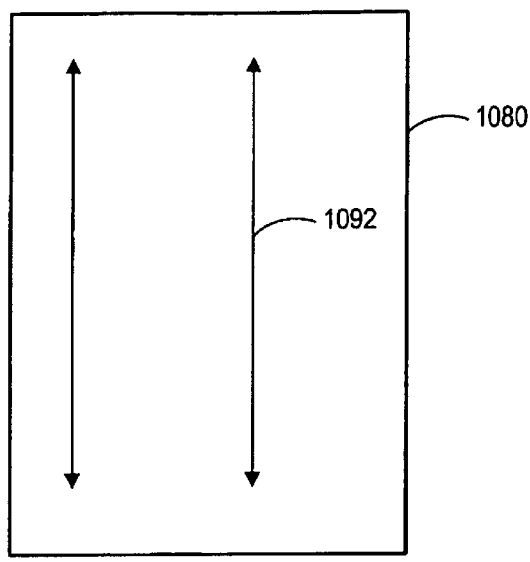
FIGS. 68 through 71 are pictorial representations of tracks geometry and of various methods for reading or writing data signals into or from a portable cards having a data storage device.
Figure 69:
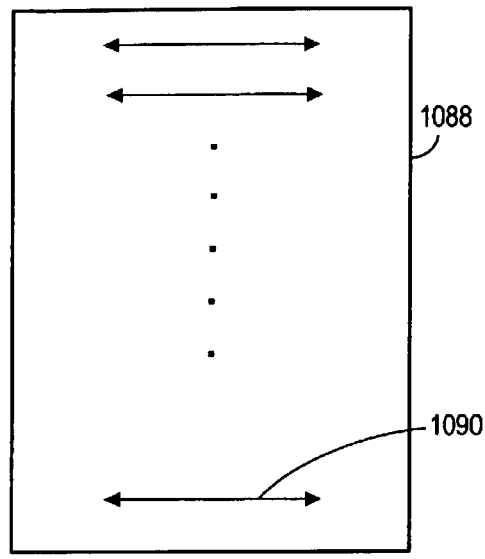
Figure 70:
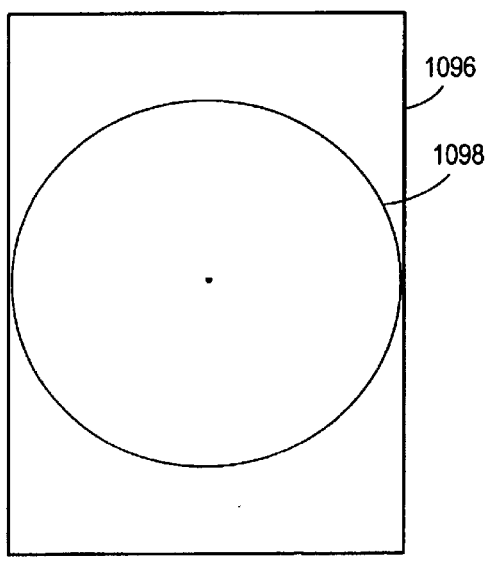
Figure 71:
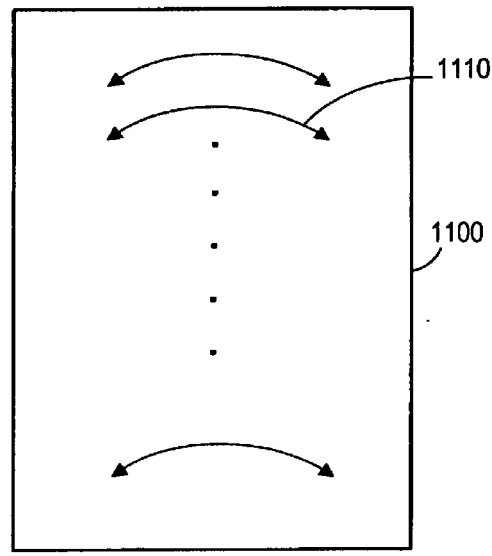

FIG. 67 is a front plan view of still yet another embodiment of a linear or rotational high-memory portable card wherein the portable card is maintained in a protective or shielding housing 1062 having a removable top section 1066 and removable bottom section 1068 which can be separated to bring or withdraw the card 1070 from the protective holder for further processing, such as moving the card into a read/write position.

FIGS. 71 through 74 are pictorial representations of tracks geometry and of various methods for reading or writing data signals into or from portable cards 1080.1088. 1096 and 1100 each having a data storage device. Card 1080 is shown having linear down or axially extending tracks 1082. Card 1088 is shown as having cross card or horizontal tracks 1090. Card 1090 is shown as having circular tracks 1096. Card 1100 is shown as having arcuate cross card tracks 1110.

Figure 72:
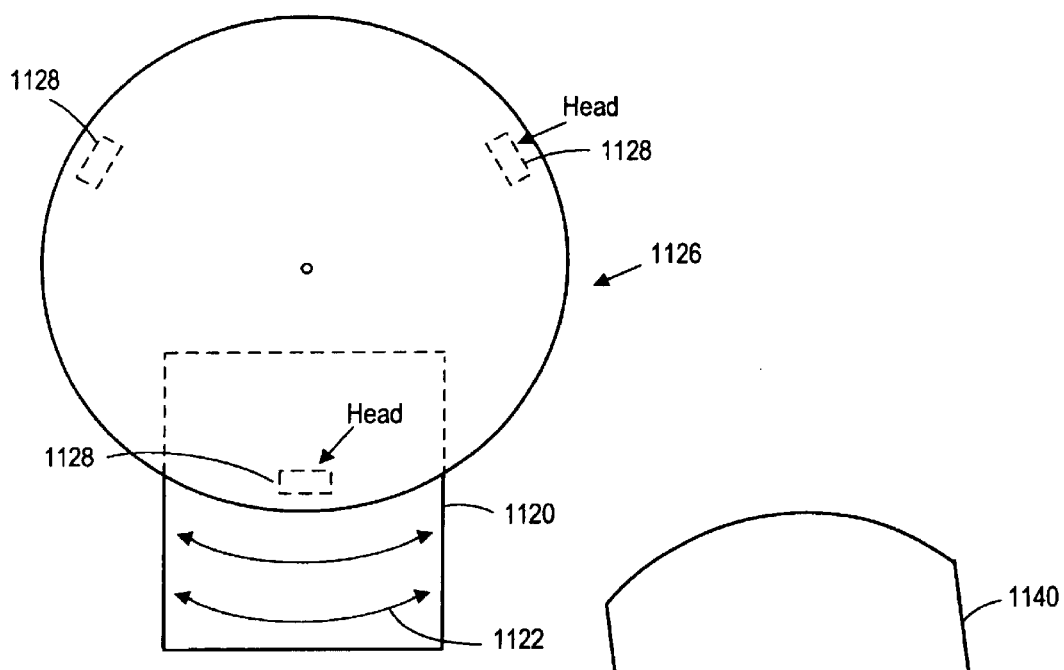
FIGS. 72 through 74 are pictorial representation of a card reader for reading or writing data on a portable card having arcuate tracks or wherein the card is bendable into an arcuate shape or position and the data storage device is scanned by a rotating or scanning transducer.
Figure 73:
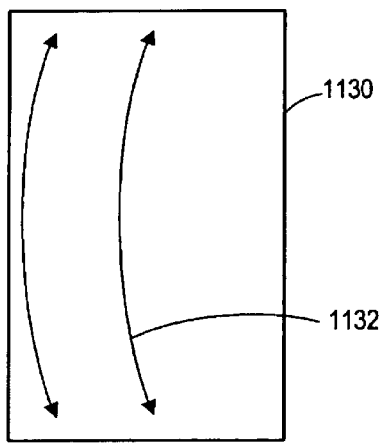
Figure 74:
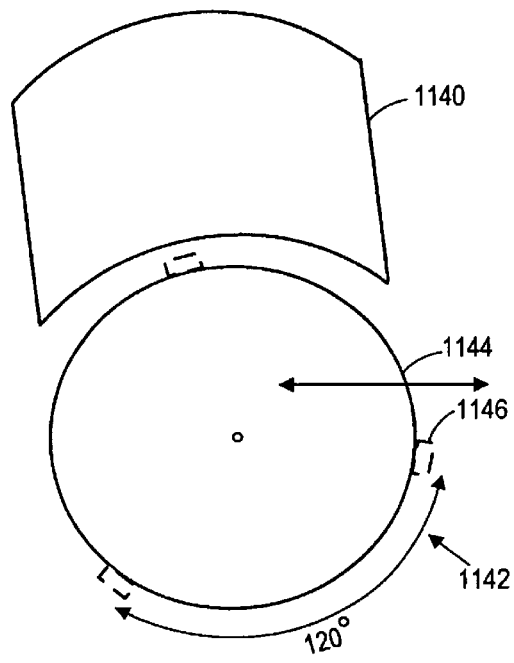

FIGS. 72 through 74 are pictorial representation of a card reader for reading or writing data on a portable card having arcuate tracks or wherein the card is bendable into an arcuate shape or position and the data storage device is scanned by a rotating or scanning transducer.

In FIG. 72, the card 1120 has arcuate shaped cross card tracks 1122 which interact with a card reader through a rotating member 1126 having three transducers 1128 which are traversed across the arcuate shaped track 1112 to read or write data onto or from the data storage device. The card is orientated to move radially to the card reader.

In FIG. 73, the card 1130 has arcuate shaped linear or axially extending card tracks 1122 which interact with a card reader through a rotating member similar to reader 1132 of FIG. 72 which can interact with three transducers which are traversed across the arcuate shaped linear tracks 1132 to read or write data onto or from the data storage device. The card 1132 is orientated to move tangentially to the card reader.

In FIG. 74, the card 1140 is bend into an arcuate shaped which interact with a card reader 1142 through a rotating member 1144 having three transducers 1146 which are traversed across the arcuate shaped track to read or write data onto or from the data storage device. The card is orientated to move parallel to the central axis of the card reader.

The portable card utilizing the teachings of the present invention has wide and multiple applications and is essentially a multi-use portable card having a data storage device. As such, the data storage device in the form of a portable card can be utilized for either or both, either solely or jointly, as a financial or credit card, and/or for non-financial data storage and/or any other transaction type card requiring the storing of magnetic signals.

For magnetically encodeable cards, portable cards or other cards or the like employing the teaching of the present invention for use with magnetics, the present invention may be practiced with a wide variety of horizontal or vertical recording materials, soft magnetic materials, non-magnetic materials and substrates. In addition conventional deposition, sputtering, plating, oxidating and web coating methods may be employed to prepare the recording medium or data storage section, or a data storage section combined with a substrate to from a data storage device, or data storage device. Media used for hard disks, floppy disks and recording mediums when used with the protective coating of the present invention may be used for practicing this invention. Further, the above-described advantages may be achieved by the addition of a relatively hard, bendable protective coating to the data storage device that can yield with movement of the card and wherein it is anticipated that a predetermined quantity of the protective coating will be abraded therefrom during normal use in an ambient normal atmospheric operating or usage environment.

The storage material which can be sued for practicing this invention include, without limitation: (i) magnetic material; optical recording material; and (iii) magneto-optical material. Such material are well known to persons skilled-in-the art, and they need not be discussed in detail herein.

All such variations and incorporating of the teachings of the present invention are envisioned to be covered by and anticipated by the teachings set forth herein.

What is claimed is:

1. A data card comprising:
   a rectangular, non-magnetic substrate including opposed first and second sides;
   a circular data storage region exposed at the first side of the substrate, wherein the data storage region includes a thin film layer of high density, high coercivity magnetic material that is overlaid by a protective layer, and the protective layer includes at least two layers, wherein one of said layers includes a magnetically permeable, magnetically saturable material and another of said layers is a non-magnetic friction reducing layer formed over the magnetically permeable, magnetically saturable material,
   wherein the data card further comprises a non-magnetic material layer positioned between the protective coating and said at least one magnetic material layer, said magnetically permeable, magnetically saturable material being responsive through said non-magnetic layer to produce a magnetic image field.

2. A data card comprising:
   a rectangular, non-magnetic substrate including opposed first and second sides;
   a circular data storage region exposed at the first side of the substrate, wherein the data storage region includes a thin film layer of high density, high coercivity magnetic material that is overlaid by a bendable, abradeable protective layer,
   wherein said protective coating comprises at least two layers, with a first one of the layers being formed of the magnetically permeable, magnetically saturable material and a second of the layers being a non-magnetic friction reducing layer formed over the magnetically permeable, magnetically saturable material, and
   wherein the data card further comprises a non-magnetic material layer positioned between the protective coating and said at least one magnetic material layer, said magnetically permeable, magnetically saturable material being responsive through said non-magnetic layer to produce a magnetic image field.

3. A data card comprising:

a rectangular, non-magnetic substrate including opposed first and second sides;

a circular data storage region exposed at the first side of the substrate, wherein the data storage region includes a thin film layer of high density, high coercivity magnetic material that is overlaid by a bendable, abradeable protective layer, and the protective layer includes includes a magnetically permeable, magnetically saturable material, wherein the data card further comprises a non-magnetic material layer positioned between the protective coating and said at least one magnetic material layer, said magnetically permeable, magnetically saturable material being responsive through said non-magnetic layer to produce a magnetic image field.

4. A method for reading a data card with a data processing station, the method comprising:

providing a data card including a rectangular, non-magnetic substrate including opposed first and second surfaces, and circular data storage region on one of the first and second surfaces, the data storage region includes a thin film layer of high density, high coercivity magnetic material that is overlaid by a bendable, abradeable protective layer that includes a magnetically permeable, magnetically saturable material;

providing a data processing station including at least one transducer capable of communicating signals with the data storage region; and rotating the data card within the data processing station while communicating signals between the at least one transducer and the data storage region, wherein the data storage region further comprises a non-magnetic material layer positioned between the protective coating and said at least one magnetic material layer, said magnetically permeable, magnetically saturable material being responsive through said non-magnetic layer to produce a magnetic image field.

5. A method for reading a data card with a data processing station, the method comprising:

providing a data card including a rectangular, non-magnetic substrate including opposed first and second sides, and a circular data region at the first side of the substrate, wherein the data region includes a thin film layer of high density, high coercivity magnetic material that is overlaid by a bendable, abradeable protective layer that includes a magnetically permeable, magnetically saturable material;

providing a data processing station including at least one transducer capable of communicating signals with the data storage region; and rotating the data card within the data processing station while communicating signals between the at least one transducer and the data storage region, wherein the data card further comprises a non-magnetic material layer positioned between the protective coating and said at least one magnetic material layer, said magnetically permeable, magnetically saturable material being responsive through said non-magnetic layer to produce a magnetic image field.

* * * * *